(12) United States Patent
Kaup et al.

(10) Patent No.: US 11,560,608 B2
(45) Date of Patent: Jan. 24, 2023

(54) COLD-ROLLED FLAT STEEL PRODUCT FOR PACKAGING MATERIALS

(71) Applicant: thyssenkrupp Rasselstein GmbH, Andernach (DE)

(72) Inventors: Burkhard Kaup, Andernach (DE); Blaise Massicot, Burgbrohl (DE); Luisa-Marie Heine, Koblenz (DE)

(73) Assignee: thyssenkrupp Rasselstein GmbH, Andernach (DE)

( * ) Notice: Subject to any disclaimer, the term of this patent is extended or adjusted under 35 U.S.C. 154(b) by 0 days.

(21) Appl. No.: 17/193,096

(22) Filed: Mar. 5, 2021

(65) Prior Publication Data

US 2021/0277495 A1    Sep. 9, 2021

(30) Foreign Application Priority Data

Mar. 6, 2020    (DE) .................... 10 2020 106 164.1

(51) Int. Cl.
| | | |
|---|---|---|
| B32B 15/01 | (2006.01) |
| C21D 9/46 | (2006.01) |
| C21D 1/06 | (2006.01) |
| C21D 6/00 | (2006.01) |
| C21D 8/02 | (2006.01) |
| C22C 38/00 | (2006.01) |
| C22C 38/02 | (2006.01) |
| C22C 38/04 | (2006.01) |
| C22C 38/06 | (2006.01) |
| C23C 8/02 | (2006.01) |
| C23C 8/26 | (2006.01) |
| C23C 8/80 | (2006.01) |

(52) U.S. Cl.
CPC .............. *C21D 9/46* (2013.01); *B32B 15/013* (2013.01); *C21D 1/06* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0273* (2013.01); *C22C 38/001* (2013.01); *C22C 38/002* (2013.01); *C22C 38/02* (2013.01); *C22C 38/04* (2013.01); *C22C 38/06* (2013.01); *C23C 8/02* (2013.01); *C23C 8/26* (2013.01); *C23C 8/80* (2013.01)

(58) Field of Classification Search
None
See application file for complete search history.

(56) References Cited

U.S. PATENT DOCUMENTS

2011/0076177 A1    3/2011    Aratani et al.

FOREIGN PATENT DOCUMENTS

EP    1706514    * 11/2015

* cited by examiner

*Primary Examiner* — Daniel J. Schleis
(74) *Attorney, Agent, or Firm* — Paul D. Bianco; Stephen Bongini; Fleit Intellectual Property Law

(57) ABSTRACT

A cold-rolled flat steel product for packaging materials has a thickness of less than 0.6 mm, which has been cold-rolled from steel along a rolling direction (0°) and which has an excellent isotropy with respect to its mechanical properties.

20 Claims, 13 Drawing Sheets

Fig. 7

Table 1

| Example | Example type | C | Mn | P | Si | Al | Cu | Cr | Nb [wt%] | Ti | S | Sn | B | Mo | Ni | N_O |
|---|---|---|---|---|---|---|---|---|---|---|---|---|---|---|---|---|
| 1 | acc. to the invention | 0.070 | 0.31 | 0.018 | 0.009 | 0.013 | 0.011 | 0.028 | 0.0010 | 0.0005 | 0.009 | 0.002 | 0.0003 | 0.003 | 0.018 | 0.0117 |
| 2 | acc. to the invention | 0.072 | 0.36 | 0.013 | 0.011 | 0.015 | 0.007 | 0.023 | 0.0008 | 0.0004 | 0.007 | 0.003 | 0.0003 | 0.003 | 0.018 | 0.0129 |
| 3 | acc. to the invention | 0.066 | 0.32 | 0.018 | 0.007 | 0.018 | 0.009 | 0.025 | 0.0008 | 0.0004 | 0.007 | 0.003 | 0.0003 | 0.003 | 0.017 | 0.0126 |
| 4 | Comparison example | 0.052 | 0.25 | 0.011 | 0.016 | 0.040 | 0.009 | 0.024 | 0.0008 | 0.0004 | 0.007 | 0.003 | 0.0003 | 0.003 | 0.019 | 0.0040 |
| 5 | Comparison example | 0.035 | 0.23 | 0.014 | 0.013 | 0.037 | 0.009 | 0.032 | 0.0008 | 0.0004 | 0.008 | 0.003 | 0.0003 | 0.003 | 0.019 | 0.0037 |
| 6 | Comparison example | 0.038 | 0.26 | 0.011 | 0.007 | 0.036 | 0.009 | 0.029 | 0.0008 | 0.0004 | 0.008 | 0.003 | 0.0003 | 0.003 | 0.019 | 0.0037 |
| 7 | Comparison example | 0.034 | 0.26 | 0.008 | 0.009 | 0.038 | 0.013 | 0.026 | 0.0008 | 0.0007 | 0.013 | 0.003 | 0.0003 | 0.003 | 0.019 | 0.0041 |
| 8 | Comparison example | 0.068 | 0.29 | 0.012 | 0.013 | 0.031 | 0.011 | 0.048 | 0.0008 | 0.0006 | 0.008 | 0.004 | 0.0003 | 0.004 | 0.023 | 0.0059 |
| 9 | Comparison example | 0.063 | 0.28 | 0.013 | 0.010 | 0.033 | 0.014 | 0.047 | 0.0008 | 0.0009 | 0.004 | 0.004 | 0.0003 | 0.004 | 0.019 | 0.0054 |
| 10 | acc. to the invention | 0.044 | 0.23 | 0.013 | 0.013 | 0.032 | 0.014 | 0.027 | 0.0008 | 0.0010 | 0.007 | 0.003 | 0.0003 | 0.002 | 0.019 | 0.0046 |
| 11 | acc. to the invention | 0.036 | 0.22 | 0.014 | 0.010 | 0.035 | 0.007 | 0.024 | 0.0008 | 0.0007 | 0.008 | 0.002 | 0.0003 | 0.002 | 0.016 | 0.0048 |
| 12 | acc. to the invention | 0.036 | 0.23 | 0.013 | 0.013 | 0.035 | 0.006 | 0.056 | 0.0008 | 0.0007 | 0.003 | 0.002 | 0.0004 | 0.003 | 0.017 | 0.0039 |
| 13 | Comparison example | 0.056 | 0.24 | 0.008 | 0.018 | 0.030 | 0.008 | 0.045 | 0.0008 | 0.0006 | 0.012 | 0.003 | 0.0003 | 0.002 | 0.019 | 0.0060 |
| 14 | Comparison example | 0.733 | 0.31 | 0.013 | 0.012 | 0.013 | 0.013 | 0.027 | 0.0008 | 0.0007 | 0.013 | 0.003 | 0.0004 | 0.003 | 0.018 | 0.0057 |
| 15 | acc. to the invention | 0.069 | 0.33 | 0.013 | 0.012 | 0.018 | 0.008 | 0.024 | 0.0008 | 0.0008 | 0.006 | 0.002 | 0.0003 | 0.003 | 0.018 | 0.0133 |
| 16 | Comparison example | 0.064 | 0.22 | 0.014 | 0.018 | 0.033 | 0.008 | 0.047 | 0.0008 | 0.0004 | 0.008 | 0.003 | 0.0003 | 0.002 | 0.018 | 0.0046 |
| 17 | Comparison example | 0.054 | 0.28 | 0.008 | 0.019 | 0.011 | 0.034 | 0.028 | 0.0008 | 0.0011 | 0.011 | 0.003 | 0.0004 | 0.004 | 0.023 | 0.0048 |
| 18 | acc. to the invention | 0.059 | 0.27 | 0.014 | 0.020 | 0.024 | 0.017 | 0.030 | 0.0008 | 0.0006 | 0.004 | 0.003 | 0.0004 | 0.003 | 0.015 | 0.0108 |
| 19 | acc. to the invention | 0.052 | 0.27 | 0.012 | 0.020 | 0.010 | 0.010 | 0.023 | 0.0008 | 0.0004 | 0.008 | 0.002 | 0.0003 | 0.002 | 0.013 | 0.0054 |
| 20 | Comparison example | 0.071 | 0.31 | 0.011 | 0.008 | 0.018 | 0.010 | 0.023 | 0.0008 | 0.0005 | 0.010 | 0.002 | 0.0003 | 0.002 | 0.020 | 0.0166 |
| 21 | acc. to the invention | 0.021 | 0.21 | 0.010 | 0.008 | 0.022 | 0.010 | 0.026 | 0.0008 | 0.0006 | 0.011 | 0.002 | 0.0003 | 0.002 | 0.015 | 0.0113 |
| 22 | acc. to the invention | 0.071 | 0.31 | 0.013 | 0.019 | 0.013 | 0.009 | 0.036 | 0.0008 | 0.0004 | 0.012 | 0.002 | 0.0003 | 0.002 | 0.017 | 0.0041 |
| 23 | acc. to the invention | 0.038 | 0.17 | 0.012 | 0.010 | 0.017 | 0.013 | 0.029 | 0.0010 | 0.0005 | 0.006 | 0.002 | 0.0003 | 0.003 | 0.018 | 0.0119 |
| 24 | Comparison example | 0.106 | 0.43 | 0.008 | 0.017 | 0.015 | 0.022 | 0.046 | 0.0010 | 0.0005 | 0.011 | 0.007 | 0.0003 | 0.004 | 0.022 | 0.0119 |
| 25 | acc. to the invention | 0.088 | 0.34 | 0.015 | 0.014 | 0.013 | 0.020 | 0.027 | 0.0008 | 0.0007 | 0.011 | 0.004 | 0.0005 | 0.002 | 0.021 | 0.0131 |
| 26 | acc. to the invention | 0.041 | 0.58 | 0.011 | 0.018 | 0.028 | 0.008 | 0.034 | 0.0008 | 0.0008 | 0.008 | 0.008 | 0.0003 | 0.003 | 0.029 | 0.0049 |

Table 2

| Example | Example type | N (after nitriding) [wt%] | O [mm] | Temper rolling degree [%] | NH3 [vol%] | Rp0.5 [MPa] | A [%] | Rm [MPa] |
|---|---|---|---|---|---|---|---|---|
| | | | | | | in the rolling direction | | |
| 1 | acc. to the invention | 0.043 | 0.268 | 12.0 | 0.40 | 881 | 8.0 | 708 |
| 2 | acc. to the invention | 0.041 | 0.189 | 18.0 | 0.39 | 795 | 6.8 | 797 |
| 3 | acc. to the invention | 0.018 | 0.268 | 10.0 | 0.38 | 815 | 8.7 | 848 |
| 4 | Comparison example | - | 0.185 | 24.0 | - | 835 | 1.5 | 838 |
| 5 | Comparison example | - | 0.232 | 0.8 | - | 431 | 21.7 | 431 |
| 6 | Comparison example | - | 0.173 | 10.0 | - | 494 | 8.1 | 497 |
| 7 | Comparison example | - | 0.160 | 22.0 | - | - | 0.3 | 663 |
| 8 | Comparison example | - | 0.182 | 1.2 | - | 458 | 18 | 458 |
| 9 | Comparison example | - | 0.184 | 11.0 | - | 532 | 1.4 | 532 |
| 10 | acc. to the invention | 0.018 | 0.132 | 9.0 | 0.39 | 596 | 7.3 | 597 |
| 11 | acc. to the invention | 0.019 | 0.182 | 17.0 | 0.39 | 624 | 6.6 | 653 |
| 12 | acc. to the invention | 0.018 | 0.211 | 1.2 | 0.17 | 457 | 16.6 | 466 |
| 13 | Comparison example | - | 0.224 | 8.4 | - | 437 | 11.3 | 454 |
| 14 | Comparison example | - | 0.238 | 7.0 | - | 647 | 4.2 | 669 |
| 15 | acc. to the invention | 0.018 | 0.310 | 10.0 | 0.04 | 806 | 6.8 | 814 |
| 16 | acc. to the invention | 0.014 | 0.209 | 8.0 | 0.20 | 649 | 7.1 | 663 |
| 17 | Comparison example | - | 0.162 | 1.4 | - | 418 | 12.1 | 431 |
| 18 | acc. to the invention | 0.023 | 0.225 | 1.0 | 0.15 | 464 | 17.4 | 483 |
| 19 | acc. to the invention | 0.018 | 0.202 | 8.0 | 0.20 | 554 | 8.3 | 562 |
| 20 | Comparison example | - | 0.222 | 11.0 | - | 627 | 4.1 | 639 |
| 21 | acc. to the invention | 0.015 | 0.360 | 10 | 0.23 | 496 | 12.4 | 513 |
| 22 | acc. to the invention | 0.072 | 0.241 | 10.0 | 1.47 | 788 | 7.1 | 788 |
| 23 | acc. to the invention | 0.017 | 0.232 | 18.0 | 0.18 | 603 | 6.1 | 615 |
| 24 | Comparison example | - | 0.177 | 4.2 | 0.08 | 475 | 14.2 | 513 |
| 25 | acc. to the invention | 0.039 | 0.164 | 8.0 | 0.34 | 638 | 7.8 | 641 |
| 26 | acc. to the invention | 0.017 | 0.431 | 8.0 | 0.18 | 578 | 8.4 | 583 |

| Table 3 | | | | Grain size | | | Grain elongation | | Mean fiber length |
|---|---|---|---|---|---|---|---|---|---|
| Example | Example type | Temper rolling degree [%] | Orientation | Photomicrograph of the grain size at (500:1) 243796 | Photomicrograph of the grain size at (500:1) 338683 | Comparison: photomicrograph 200:1 | [Y/X] in % | [X/Y] | μm |
| 1 | acc. to the invention | 12 | Longitudinal | 13.3 | 13.3 | 12 | 84.7 | 1.2 | 3.5 |
| 1 | acc. to the invention | 12 | Transverse | 13.3 | 13.3 | 12 | 79.6 | 1.3 | 3.5 |
| 1 | acc. to the invention | 12 | Surface | 12.8 | 12.8 | 11-12 | 73.7 | 1.4 | 4.2 |
| 2 | acc. to the invention | 16 | Longitudinal | 13.2 | 13.2 | 12 | 81.4 | 1.5 | 3.7 |
| 2 | acc. to the invention | 16 | Transverse | 13.3 | 13.3 | 12 | 75.1 | 1.3 | 3.4 |
| 2 | acc. to the invention | 16 | Surface | 12.8 | 12.8 | 12 | 80.0 | 1.3 | 4.1 |
| 3 | acc. to the invention | 10 | Longitudinal | 13.4 | 13.4 | 12 | 80.6 | 1.8 | 3.4 |
| 3 | acc. to the invention | 10 | Transverse | 13.3 | 13.3 | 12 | 74.2 | 1.3 | 3.3 |
| 3 | acc. to the invention | 10 | Surface | 12.9 | 12.9 | 11-12 | 72.1 | 1.4 | 3.7 |
| 4 | Comparison example | 24 | Longitudinal | 13.1 | 13.1 | 12 | 47.0 | 2.1 | 5.3 |
| 4 | Comparison example | 24 | Transverse | 13.2 | 13.2 | 11-12 | 56.0 | 1.8 | 5.3 |
| 4 | Comparison example | 24 | Surface | 12.1 | 12.1 | 11-12 | 76.6 | 1.3 | 5.3 |
| 5 | Comparison example | 0.8 | Longitudinal | 13.1 | 13.1 | 11-12 | 80.0 | 1.5 | 4.8 |
| 5 | Comparison example | 0.8 | Transverse | 12.5 | 12.5 | 10-11 | 72.3 | 1.4 | 5.1 |
| 5 | Comparison example | 0.8 | Surface | 12.6 | 12.6 | 11-12 | 54.9 | 1.7 | 4.2 |
| 6 | Comparison example | 10 | Longitudinal | 13.2 | 13.2 | 11-12 | 58.1 | 1.3 | 3.7 |
| 6 | Comparison example | 10 | Transverse | 12.1 | 12.1 | 10-11 | 50.0 | 1.8 | 3.4 |
| 7 | Comparison example | 22 | Longitudinal | 13.2 | 13.2 | 11-12 | 58.4 | 1.8 | 3.7 |
| 7 | Comparison example | 22 | Transverse | 13.2 | 13.2 | 11-12 | 62.7 | 1.6 | 3.7 |
| 7 | Comparison example | 22 | Surface | 12.2 | 12.2 | 10-12 | 70.0 | 1.4 | 5.2 |
| 8 | Comparison example | 1.2 | Longitudinal | 13.2 | 13.2 | 11-12 | 65.9 | 1.5 | 3.7 |
| 8 | Comparison example | 1.2 | Transverse | 12.6 | 12.6 | 11-12 | 79.2 | 1.3 | 4.5 |
| 8 | Comparison example | 1.2 | Surface | 12.6 | 12.6 | 12 | 74.9 | 1.3 | 3.9 |
| 9 | Comparison example | 11 | Longitudinal | 13.3 | 13.3 | 11-12 | 68.8 | 1.5 | 3.5 |
| 9 | Comparison example | 11 | Transverse | 13.4 | 13.4 | 11-12 | 54.4 | 1.6 | 3.7 |
| 9 | Comparison example | 11 | Surface | 12.3 | 12.3 | 10-12 | 58.8 | 1.5 | 5.1 |
| 10 | acc. to the invention | 8 | Longitudinal | 13.4 | 13.4 | 11-12 | 58.2 | 1.7 | 3.7 |
| 10 | acc. to the invention | 8 | Transverse | 12.9 | 12.9 | 11-12 | 73.0 | 1.4 | 3.4 |
| 10 | acc. to the invention | 8 | Surface | 12.9 | 12.9 | 11-12 | 80.5 | 1.2 | 4.1 |
| 11 | Comparison example | 17 | Longitudinal | 12.9 | 12.9 | 11-12 | 44.8 | 2.2 | 4.5 |
| 11 | Comparison example | 17 | Transverse | 12.9 | 12.9 | 10-11 | 53.9 | 1.5 | 4.5 |
| 11 | Comparison example | 17 | Surface | 12.3 | 12.3 | 10-11 | 62.0 | 1.2 | 5.1 |
| 12 | acc. to the invention | 1.2 | Longitudinal | 13.1 | 13.1 | 11-12 | 58.4 | 1.5 | 5.3 |
| 12 | acc. to the invention | 1.2 | Transverse | 12.5 | 12.5 | 11-12 | 70.0 | 1.4 | 3.9 |
| 12 | acc. to the invention | 1.2 | Surface | 12.5 | 12.5 | 10-11 | 59.7 | 1.5 | 5.0 |
| 13 | Comparison example | 1.4 | Longitudinal | 13.3 | 13.3 | 11-12 | 69.9 | 1.3 | 3.6 |
| 13 | Comparison example | 1.4 | Transverse | 13.3 | 13.3 | 11-12 | 75.7 | 1.3 | 3.5 |
| 13 | Comparison example | 1.4 | Surface | 12.7 | 12.7 | 11-12 | 78.8 | 1.3 | 4.4 |
| 14 | Comparison example | 7 | Longitudinal | 13.5 | 13.5 | 12 | 67.0 | 1.5 | 3.4 |
| 14 | Comparison example | 7 | Transverse | 13.4 | 13.4 | 11-12 | 77.3 | 1.3 | 4.3 |

Fig. 10

COLD-ROLLED FLAT STEEL PRODUCT FOR PACKAGING MATERIALS

FIELD OF THE INVENTION

The present invention relates to a cold-rolled flat steel product for packaging materials.

BACKGROUND

For reasons of resource efficiency and cost reduction, efforts are underway to reduce the thickness of flat steel products (sheet steel and strip steel) for use in the production of packaging materials (hereinafter also referred to as packaging steel). The thickness of cold-rolled packaging steels is typically in the range of blackplate, i.e., between 0.1 and 0.6 mm. However, since a thickness reduction also entails a decrease of the stiffness of the material, the strength of the packaging steel must be increased so that the material is able to meet the requirements needed to ensure its cold workability in forming operations during the production of packaging materials, e.g., in deep drawing or ironing processes. At the same time, however, the formability of sheet steel in cold working processes must be maintained. Therefore, there is a great need for high-strength sheet steels with a yield strength higher than 550 MPa which, at the same time, have good formability characteristics, e.g., an elongation at break of a minimum of 5% and/or an Erichsen index (according to DIN standard 50101, also designated as Erichsen cupping index, of a minimum of 5 mm as measured according to the cupping test according to Erichsen which is standardized in DIN standard EN ISO 20482).

There are many ways of increasing the strength of sheet steels, e.g., strain hardening, solution hardening (by adding carbon, nitrogen, phosphorus, manganese and/or silicon as alloying elements), precipitation hardening, increasing the strength by causing the formation of a polyphase structure in steel, or grain boundary hardening. However, many of these measures entail undesirable accompanying effects.

As strain hardening increases, an increase in the differences in length and width and, as a result, in the anisotropy occurs during the production of cold-rolled sheet steels, and, at the same time, the ductility decreases disproportionately.

During solution hardening, foreign atoms (for example, N, C, P, Mn, Si) are incorporated into substitutional or interstitial sites of the host lattice of the steel. Many of the potential alloying elements have negative accompanying effects (thus, for example, P is detrimental to steel, Mn and Si impair the surface quality), which explains why the addition of these alloying elements for the purpose of increasing the strength does not lead to the desired results.

When steel is alloyed with carbon, the strength of the steel increases with the carbon content; however, at the same time, during the processing of the sheet steel, a pronounced anisotropy in the form of banding develops, since the carbon, due to the low solubility in the ferrite lattice of steel, is present mainly in the form of cementite. Furthermore, as the carbon content increases, the surface quality deteriorates, and the risk of crack formation in the slab increases as the peritectic point is approached. The carbon content must therefore be reduced to a maximum of 0.1 wt %, since only then will it be possible to effectively prevent the crack formation in the slab and the resultant point oxidation (diffusion of oxygen into cracks).

In the prior art, sheet steels for use as packaging materials and methods of their production are known, in which an amount of carbon and nitrogen sufficient for solution hardening is added to the steel melt in order to achieve strengths higher than 500 MPa. For example, US 2011/0076177 A1 discloses a high-strength sheet steel for the production of cans, having a carbon content of 0.02 wt % to 0.10 wt % and a nitrogen content of 0.012 wt % to 0.0250 wt %, which has ultimate tensile strengths higher than 500 MPa, with the weight percentage of free nitrogen, i.e., the weight percentage interstitially incorporated into the steel, being a minimum of 0.0100%. It was found that an increase in the strength of steel is attributable decisively to the free nitrogen during solution hardening and age hardening. However, the increase in strength obtained by interstitial incorporation of nitrogen is limited by the partial fixation of nitrogen to nitrides, especially to AlN, on the one hand, and by the fact that at a nitrogen content higher than 0.025%, the risk of crack formations in the slab during hot rolling markedly increases, on the other hand.

In precipitation hardening, for example, by adding the alloying elements Ti or Nb, the problem is that because of the high temperature, precipitates form already during hot rolling. Therefore, these precipitates are involved in all of the subsequent production steps, such as cold rolling, annealing and, as appropriate, temper rolling or dressing, and comparable to cementite, they develop a pronounced anisotropy, especially if the precipitation preferentially occurs at grain boundaries. Furthermore, the precipitating agents Ti and Nb contribute to an increase in the recrystallization temperature.

Due to the normative requirements with respect to the alloying components in steel, increasing the strength of packaging steel by causing the formation of a polyphase structure in steel is extremely limited from the outset. The conventional polyphase steels, such as are used in the automobile industry, can therefore not be used for packaging steel since, due to the normative requirements set out in the packaging steel standard (DIN standard EN 10202), the alloying components such as manganese and silicon can be used only up to a maximum percentage by weight. Although it is possible to cause the formation of a polyphase structure in packaging steel by means of a special refrigeration technique, the resultant microstructural status is characterized by considerable instability, and in most cases, the increase in strength goes hand in hand with reduced formability. If the polyphase structure is predominantly based on the alloying element carbon, the additional risk is that the anisotropy of cementite is transferred to the polyphase structure and, as a result, is even further intensified.

In grain boundary hardening, it is possible to increase the strength of steel, while maintaining the formability unchanged, by causing the formation of a fine-grained structure, which fine-grained structure can be technically achieved by means of a low reel temperature (winding temperature after hot rolling), high degrees of deformation during cold rolling, and by means of annealing the cold-rolled sheet steel using continuous annealing. It is further possible to cause the formation of a fine-grained structure by means of microalloying and influencing the precipitation properties in the hot strip. However, the alloying elements needed for this purpose are expensive and increase the annealing temperature required for recrystallization. Furthermore, because of an increased base strength of the hot strip, the cold rollability deteriorates, and the surface of the sheet steel becomes more susceptible to defects.

Consequently, the above-mentioned possibilities of increasing the strength of sheet steels while maintaining the formability lead to problems, particularly with respect to the isotropy, i.e., with respect to the directional dependence of the material properties. Since packaging materials, such as beverage or food cans, e.g., in most cases are (rotationally) symmetrical items, sheet steels used to produce packaging materials frequently are available in the form of round blanks (i.e., in the form of a plane circular sheet metal blank) which are formed into a cylindrical can body or a cylindrical can bottom or lid using deep drawing and ironing operations. Because of the symmetry of the final product, the material properties of the sheet metals should be as isotropic as possible, i.e., the properties of the packaging metals should be as uniform as possible in all directions of the metal plane. For cold-rolled sheet steels, which, by nature of the manufacturing process, are available in the form of strip steel, this is an extremely complex requirement since because of the rolling direction in hot rolling and cold rolling, the material properties, by nature of the manufacturing process, are invariably dependent on the rolling direction. Therefore, cold-rolled sheet steels, by nature of the manufacturing process, always have a pronounced anisotropy. This anisotropy is decisively attributable to the high degree of deformation during cold rolling, which in turn is required to achieve extremely thin metal sheet thicknesses. Since in the production of packaging materials, the cold-rolled sheet steel is always processed independently of the rolling direction, difficulties frequently arise during the forming operation since, e.g., the strength and formability are not uniform across the circumference of the round blank.

SUMMARY

Therefore, there is a great need for a packaging steel in the form of a cold-rolled flat steel product which is characterized by the most isotropic possible properties within the plane of the sheet metal of the flat steel product. In the context of the continuous reduction of the thickness of the flat steel product and the increase in strength required therefor, this is a contradictory goal which is difficult to achieve. Furthermore, in addition to the isotropic properties of the flat steel product, other requirements to be met by the packaging steels must be considered in the production of packaging materials, in particular with respect to the flexibility of the forming operations and the shapes of the packaging materials, the reduction of scrap and the implementation of the most uniform and homogeneous properties as possible of the packaging material required therefor.

Thus, one problem to be solved by the present invention is to make available a high-strength flat steel product for use in the production of packaging materials with the most isotropic material properties possible in the sheet metal plane, from which flat steel product, packaging materials with excellent isotropic properties and in the most varied geometries can be produced in different forming operations with the lowest possible scrap.

Since packaging steel is processed into the finished packaging material once it is in an aged condition, i.e., after a relatively long storage time and, if appropriate, after painting and drying, the material must be optimized, taking into account the effects of aging of the material which occur after a relatively long storage time and/or painting and subsequent drying. The technical parameters of packaging steels are therefore determined after the material has been artificially aged, which can be carried out according to DIN standard EN 10202 by heating the specimen for 20 min to 200° C. Since during the (natural or artificial) aging of sheet steels, especially the strength and formability are influenced, the effects of aging must be taken into account when optimizing the material properties.

Due to the above-mentioned reasons, the improvement of the material properties of cold-rolled sheet steels with respect to strength and formability is made at the expense of the isotropy with respect to the material properties. To impart isotropic properties to sheet steels, different metallurgical and process-engineering techniques can be used in the production of cold-rolled sheet steels. One option for specifically improving the isotropy of cold-rolled sheet steels, for example, is the addition of boron as an alloying agent. However, boron has negative effects on the workability of steel and on the final product (sheet steel). After the addition of boron as an alloying agent, the annealing temperature required for recrystallizing the sheet steel after cold rolling increases, the weldability of the material deteriorates, and the aging potential (i.e., the increase in strength during aging of the sheet steel) decreases.

Another problem to be solved by the invention therefore is to make available cost-effectively producible packaging steels and a method for the production thereof, which packaging steels have the highest possible strength while maintaining a suitable formability sufficient for deep drawing and ironing operations, on the one hand, and the highest possible isotopy of the material properties with respect to strength and formability in the aged condition of the material, on the other.

A flat steel product according to the invention is disclosed herein. In this context, a flat steel product is intended to refer to slab- or strip-shaped sheet steel having a thickness in the range of blackplate, especially a thickness range from 0.1 to 0.6 mm.

The invention is based on the finding that solution hardening by means of interstitially incorporated alloying components of steel makes it possible at the same time to improve the strength, formability, and isotropy, and that solution hardening by means of carbon and nitrogen is especially effective, provided that a fixation of carbon and nitrogen to carbides and nitrides can at least to a large extent be technically suppressed. The formation of carbides and nitrides would promote the formation of anisotropic properties.

Another finding on which the invention is based is that the incorporation of nitrogen by nitriding a cold-rolled flat steel product in an annealing furnace in the presence of a nitrogen donor at the end of the production route of packaging steel is especially well-suited both to implement effective solution hardening by means of nitrogen and to improve the isotropy with respect to the material properties, especially the yield strength and the elongation at break, relevant for further workup of the flat steel product in the production of packaging materials. The reason is that it was found that, in contrast to increasing the nitrogen content by introducing nitrogen into the steel melt, nitriding in an annealing furnace essentially leads to an interstitial incorporation of nitrogen without a fixation of nitrogen to nitrides.

Surprisingly, it was found that the nitrogen, which is interstitially incorporated into the cold-rolled flat steel product during the nitriding cycle in the annealing furnace (especially in a continuous annealing furnace prior to or during recrystallization annealing), has a positive effect on the formability and isotropy with respect to material properties. Apparently because of a uniform distribution of the nitrogen in the (ferrite) lattice of steel, the interstitial incorporation of nitrogen leads to an exceptional isotropy with respect to the mechanical properties of the flat steel product.

This is further enhanced by the fact that the interstitial incorporation of nitrogen, in comparison to carbon, shifts the location of the peritectic point to higher alloy contents, which means that an incorporation of large amounts of nitrogen at interstitial sites of the steel lattice is considerably less critical with respect to the surface quality and the risk of crack formation in the slab than the interstitial incorporation of carbon. To prevent the crack formation in the slab, the weight percentage of carbon in the inventive flat steel product is limited to 0.10%. As to the incorporation of nitrogen, on the other hand, the nitrogen content is limited only by the limited solubility of nitrogen in the ferrite lattice of steel and the economic viability of the production process; thus, taking into account the solubility limit of nitrogen in the ferrite lattice of approximately 0.1 wt % and a partial fixation of the nitrogen to nitrides in the presence of strong nitride forming elements, such as Al, Ti, Nb and/or B, the nitrogen content in steel is limited to a maximum of 0.120 wt %. From the standpoint of process engineering, the nitrogen content of the nitrided flat steel product according to the invention is preferably limited to a maximum of 0.070 wt % since nitriding the cold-rolled flat steel product in the (continuous) annealing furnace in excess of this amount requires such a high degree of technical complexity that it is at least currently not yet economically viable. For technical and economic reasons, the weight content of nitrogen is therefore most preferably 0.050% or less.

In this context, it is particularly useful to add the nitrogen to the flat steel product as late as possible during the manufacturing process in order to prevent that after nitriding, varying material properties form in and transverse to the rolling direction, particularly as a result of cold roll passes along a rolling direction. The flat steel product according to the invention can be nitrided, for example, after the (primary) cold rolling procedure prior to or during the annealing process in a continuous annealing furnace.

Since nitriding takes place only after the (primary) cold rolling procedure, nitrogen is not part of the processing steps hot rolling and (primary) cold rolling, which lead to a massive anisotropy with respect to the material properties. An interstitial incorporation of nitrogen into the iron lattice (ferrite lattice) during or after recrystallization annealing further enhances the homogeneity of the packaging steel according to the invention. More particularly, the risk of nitride precipitation is avoided, which, during temper rolling, would increase the directional dependence of the material properties.

For twice cold-rolled sheet steel, the temper rolling degree during the second cold roll pass can be reduced because of the higher base strength of the steel achieved by the interstitially incorporated nitrogen as a result of solution hardening, and the anisotropy caused thereby can be minimized. Thus, the temper rolling degree during the second cold roll pass can be preferentially limited to 18% or less.

The present invention therefore relates to a (once or twice) cold-rolled flat steel product for packaging materials, having a thickness of less than 0.6 mm, which has been cold-rolled from steel along a rolling direction (0°) and which has the following composition in percent by weight:

C: 0.02 to 0.1%,
Si: lower than 0.03%,
Mn: 0.17 to 0.5%,
P: lower than 0.03%,
S: 0.001 to 0.03%,
Al: 0.002 to 0.1%,
N: 0.014 to 0.12%, preferably lower than 0.07%,
optional Cr: lower than 0.1%, preferably 0.01 to 0.08%,
optional Ni: lower than 0.1% preferably 0.01 to 0.05%,
optional Cu: lower than 0.1%, preferably 0.002 to 0.05%,
optional Ti: lower than 0.01%,
optional B: lower than 0.005%,
optional Nb: lower than 0.010%,
optional Mo: lower than 0.02%,
optional Sn: lower than 0.03%,
residual iron and unavoidable impurities, with the flat steel product in the aged condition having a yield strength at 0.5% offset (Rp0.5) of a minimum of 450 MPa and an elongation at break (A) of a minimum of 5% and with the energy of deformation W($\alpha$), which is defined by the product of elongation at break (A) and yield strength at 0.5% offset (Rp 0.5) as a function of angle ($\alpha$) relative to the rolling direction (0°) being no less than 60% and no more than 140% of the energy of deformation in the rolling direction W(0°).

Of the nitrogen contained in the flat steel product, preferably a weight percentage of a minimum of 0.010% is interstitially incorporated in uncombined form in the steel.

The flat steel product according to the invention is characterized by a high yield strength at 0.5% offset (Rp0.5) of a minimum of 450 MPa and good elongation at break (A) of a minimum of 5% in the rolling direction (0°) and by a homogeneous and only negligible directional dependence of the energy of deformation W($\alpha$) in the plane of the flat steel product spanned by the angle $\alpha$. The energy of deformation W($\alpha$) (which continues to be direction-dependent because of the roll passes along the rolling direction) is a suitable measure for evaluating whether cold-rolled sheet steels can be used to manufacture packaging materials by forming in deep drawing and ironing processes, since the energy of deformation W calculated from the product of the elongation at break (A) and the yield strength at 0.5% offset (Rp 0.5) is a measure of both the strength of the sheet steel and for its formability. For reasons further explained below, the yield strength at 0.5% offset (Rp0.5) proved to be a suitable measure for evaluating the strength of an aged flat steel product.

In the flat steel product according to the invention, the yield strength at 5% offset (Rp0.5), which is dependent on the angle ($\alpha$) relative to the rolling direction (0°), is in a range between an upper threshold limit and a lower threshold limit, with the lower threshold limit being a minimum of 90% and the upper threshold limit being a maximum of 110% of the yield strength at 0.5% offset (Rp0.5) in the rolling direction (0°) and with the yield strength at 0.5% offset (Rp0.5) in the rolling direction being a minimum of 450 MPa.

In the flat steel product according to the invention, the elongation at break A($\alpha$), which is dependent on the angle ($\alpha$) relative to the rolling direction (0°), is also in a range between an upper threshold limit and a lower threshold limit, with the lower threshold limit being a minimum of 60% and the upper threshold limit being a maximum of 140% of the elongation at fraction in the rolling direction A(0°) and with the elongation at break (A) in the rolling direction being a minimum of 5%.

Accordingly, the energy of deformation W($\alpha$), which is dependent on the angle ($\alpha$) relative to the rolling direction (0°), is preferably in a range between a minimum of 70% and a maximum of 130% of the energy of deformation in the rolling direction W(0°).

Because of the diffusion of nitrogen into the cold-rolled flat steel product during the nitriding cycle in the annealing furnace at annealing temperatures, which are preferably higher than 630° C. (temperature of the flat steel product) in order to ensure complete recrystallization, the diffused nitrogen is uniformly distributed and incorporated in the lattice of the steel. The uniform distribution of the interstitially incorporated nitrogen leads to a high isotropy with respect to the mechanical properties of the nitrided flat steel product, which were influenced by the nitriding process, especially with respect to the elongation at break and the yield strength and, as a result, with respect to the energy of deformation as a product of the yield strength at 0.5% offset (Rp0.5) and the elongation at break (A), which is relevant as a quality measure for deep drawing applications. The most homogeneous distribution possible of the nitrogen incorporated in the annealing furnace is observed at longer dwell times of the flat steel product in the annealing furnace and in particular at longer annealing times during recrystallization annealing. The dwell time of the flat steel product in the annealing furnace is preferably longer than 10 seconds, more preferably longer than 30 seconds, and especially in a range from 100 to 250 seconds. At dwell times longer than 400 seconds, the throughput rate of the strip-shaped flat steel product through a continuous annealing furnace over a typical throughput path length would have to be so low that for economic reasons, it would no longer be possible to demonstrate the efficiency of the process, which is the reason that annealing times longer than 400 seconds can only be set in a batch annealing process, if at all.

The isotropy with respect to the material properties relevant to the cold working cycle, such as the yield strength at 0.5% offset (Rp0.5), the elongation at break (A) and the energy of deformation (W), which is achieved in the flat steel product according to the invention by nitriding after the cold rolling cycle, can be reached in spite of the elongation of the steel grains which, due to (single or double) cold rolling, cannot be avoided. In the flat steel product according to the invention, the grains of the steel structure typically have a mean fiber length of 3.0 to 6.0 µm and a direction-dependent grain elongation (S) which, for example, in the rolling direction (0°), is a minimum of 1.4 in longitudinal sections of the flat steel product and a minimum of 1.1 in planar sections of the flat steel product. Thus, it follows that in the flat steel product according to the invention, in spite of the grain elongation inherent in the manufacturing process, it is possible to achieve isotropic properties with respect to the yield strength, the elongation at break, and the resultant energy of deformation in the metal plane.

The grain elongation (S) of the grains of the steel structure is defined as the ratio of the mean horizontal fiber length (S_H) to the mean vertical fiber length (S_V). Transverse to the rolling direction ($\alpha=90°$), the grain elongation (S), which is dependent on angle $\alpha$, in the flat steel product is typically a minimum of 1.2.

Since solution hardening produced by nitriding the flat steel product is most efficient when the added nitrogen is interstitially incorporated into interstitial sites of the steel (particularly into the ferrite lattice), it is useful if the alloy composition of the steel contains the fewest possible strong nitride forming elements, such as Al, Ti, B, and/or Nb, in order to prevent nitrogen from being bound in the form of nitrides. Therefore, the alloy composition of steel preferably has the following upper threshold limits for the percent content by weight of these strong nitriding alloy components:

Al: <0.1%, preferably lower than 0.05%;
Ti: <0.010%, preferably lower than 0.002%;
B: <0.005%, preferably lower than 0.0010%;
Nb: <0.010%, preferably lower than 0.002%;

The total weight content of the nitride forming elements is preferably lower than 0.1%. This ensures, in particular, that the weight content of the free nitrogen is greater than 0.01%.

The weight content of free nitrogen in the hot-rolled strip $N_{free}$ (hot-rolled strip) can be described by Equation 1, based on the assumption that the nitride forming elements Al, Ti, B, and Nb possibly contained in the steel within the threshold limit limits listed above are completely fixed with nitrogen to form nitrides:

$$N_{free}(\text{hot-rolled strip}) = \tfrac{1}{2}(N_0 - \text{Ti}/3.4 - \text{B}/0.8 - \text{Nb}/6.6 - \text{Al factor} + |N_0 - \text{Ti}/3.4 - \text{B}/0.8 - \text{Nb}/6.6 - \text{Al factor}|) \quad \text{(Equation 1)},$$

where $N_0$ is the weight content of nitrogen in the melt of the steel, the Al factor is defined as a function of the reel temperature HT (winding temperature of the hot-rolled strip) and the aluminum content Al (in wt %) as follows:
  if HT<640° C.: Al factor=0;
  if 750≥HT≥640° C.: Al factor=$N_0 - N_0 \times (-0.682 \text{ HT} + 536)/100 = N_0 \times (1 - (-0.682 \text{ HT} + 536)/100)$;
and the summand $$|N_0 - \text{Ti}/3.4 - \text{B}/0.8 - \text{Nb}/6.6 - \text{Al factor}|$$

is defined as the sum of the difference "$N_0 - \text{Ti}/3.4 - \text{B}/0.8 - \text{Nb}/6.6 - \text{Al factor}$". In Equation 1, this sum summand takes into account that, at a maximum, only the total nitrogen actually present in the hot-rolled strip (i.e., in the steel melt) can be fixed by the nitride forming elements present in the hot-rolled strip (i.e., in the steel melt).

The total weight content of the free nitrogen in the cold-rolled flat steel product results from the sum of the free nitrogen content in the hot-rolled strip ($N_{free}$ (hot-rolled strip) according to Equation 1 above) and the nitrogen ΔN added by nitriding in the continuous annealing furnace:

$$N_{free} = N_{free}(\text{hot-rolled strip}) + \Delta N \quad \text{(Equation 2)}$$

This is based on the assumption that the nitrogen content ΔN, which is introduced during the nitriding procedure in the continuous annealing furnace, is incorporated at least to a large extent interstitially into interstitial sites. The upper threshold limit for the weight content of free nitrogen in the cold-rolled flat steel product is determined by the solubility limit of nitrogen in the ferrite lattice of the steel, which is approximately 0.1 wt %.

The total weight content of free nitrogen in the cold-rolled flat steel product ($N_{free}$) is preferably greater than 0.01%. In order to introduce as high a proportion of unbound nitrogen as possible into the cold-rolled flat steel product, preferably the major portion of the total weight content of the nitrogen is introduced by nitriding in the continuous annealing furnace, with the weight content of ΔN preferably being a minimum of 0.002 wt %, and most preferably higher than 0.008 wt %.

The flat steel product according to the invention is obtained by means of a manufacturing process in which, first, a hot-rolled strip is produced from a slab, which is produced from the above-mentioned steel melt, by hot rolling at a preferred final rolling temperature of >Ar3 and in particular between 800° C. and 900° C., which hot-rolled strip is wound up at a winding temperature (reel temperature HT) of <Ar1, and in particular at a temperature in the range from 500° C. to 750° C. and, after cooling, is cold-rolled at a reduction ratio of a minimum of 80% to form a flat steel product (strip steel), and is subsequently recrystallization-annealed in an annealing furnace, in particular a continuous annealing furnace, at an annealing temperature of a minimum of 630° C. and, at least intermittently, in the presence of a nitrogen donor, and is then cooled to room temperature and finally temper-rolled or dressed to a temper rolling degree of 0.2% to 45%. The temper rolling degrees are preferably lower than 18% to ensure that the isotropic properties are not negatively affected by the temper rolling cycle.

Nitriding the flat steel product in the continuous annealing furnace can be done prior to, during, or after recrystallization annealing. For example, it is possible to perform the nitriding procedure in the continuous annealing furnace in a first upstream zone of the continuous annealing furnace at a first temperature below the recrystallization temperature in the presence of a nitrogen donor and to heat the flat steel product thereafter for recrystallization annealing in a second downstream zone of the continuous annealing furnace to a second temperature above the recrystallization temperature. The sequence of nitriding and recrystallization annealing can also be reversed. Separating the nitriding cycle from the recrystallization annealing cycle and carrying them out in different zones of the continuous annealing furnaces has the advantage that the optimum temperature can be set for each procedure, with the optimum temperature for the nitriding procedure being lower than that for the recrystallization annealing cycle. However, for economic reasons, simultaneously nitriding and annealing the flat steel product in the continuous annealing furnace at a temperature above the recrystallization temperature in the presence of a nitrogen donor is to be preferred.

The properties of the flat steel product produced in this manner evolve after the temper-rolled strip steel has been aged, with aging being achieved either artificially by heating to 200° C. for 20 minutes or by coating the flat steel product with varnish and subsequently drying the varnish.

The hot-rolled strip preferably already has an initial nitrogen content $N_0$ in a range of 0.001 wt % to 0.016 wt % in order to maximize the total nitrogen content in the cold-rolled flat steel product and the solution hardening caused by nitriding the cold-rolled strip. To prevent the crack formation in the slab during casting of the slab and during hot rolling and to ensure that the strength of the hot-rolled strip is not already increased to such an extent that it can no longer be cold-rolled with standardly used cold rolling equipment, the weight content of nitrogen in the steel melt, from which the hot-rolled strip is produced, should not exceed 0.016%. The total nitrogen content of the flat steel product according to the invention, which consists of the sum of the initial nitrogen content $N_0$ and the nitrogen content $\Delta N$ incorporated during nitriding in the annealing furnace, is set during annealing of the cold-rolled flat steel product by the presence of the nitrogen donor in the annealing furnace in that at the annealing temperatures, dissociated atomic nitrogen of the nitrogen donor diffuses into the cold-rolled flat steel product, thereby increasing the nitrogen content by $\Delta N$. The nitrogen content $\Delta N$ introduced during nitriding in the annealing furnace is preferably a minimum of 0.002 wt %, which increases the total nitrogen content of the flat steel product to more than 0.014 wt % if the initial nitrogen content $N_0$ in the steel melt was lower than this value. The cold-rolled flat steel product is most preferably nitrided in the continuous annealing furnace to a nitrogen content higher than 0.020 wt %. The total nitrogen content of the flat steel product nitride in the continuous annealing furnace can (at least theoretically) range up to the solubility limit of nitrogen of approximately 0.1% in the (ferrite) lattice of steel.

The nitrogen donor involved can be, for example, a nitrogen-containing gas atmosphere in the annealing furnace, in particular an ammonia-containing atmosphere, of a nitrogen-containing liquid which is applied to the surface of the cold-rolled flat steel product before the product is heated in the annealing furnace. The nitrogen donor used should be of such a type that it undergoes dissociation and thereby makes atomic nitrogen available in the annealing furnace, so as to diffuse into the flat steel product. The nitrogen donor involved can, in particular, be ammonia gas. To ensure that this ammonia gas dissociates in the annealing furnace to form atomic nitrogen, the annealing furnace is preferably set to furnace temperatures above 400° C. during for nitriding of the cold-rolled flat steel product.

Due to the increase in strength resulting from solution hardening by nitriding the flat steel product during annealing in the (continuous) annealing furnace in the presence of the nitrogen donor, no temper rolling of the flat steel product according to the invention at a high temper rolling degree is necessary to further increase the strength by subjecting it to strain hardening. The temper rolling degree can therefore preferably be limited to a maximum of 18%, thereby making it possible to prevent a deterioration of the isotropy of the material properties as a result of a second cold rolling cycle at high temper rolling degrees.

After the second cold rolling or dressing cycle, a coating can be applied to the surface of the flat steel product for the purpose of improving the corrosion resistance, for example, by electrolytically precipitating a tin or chromium/chromium oxide coating and/or by painting the surface with a varnish or by laminating a polymer sheet made of a thermoplastic material, especially a sheet made of polyester, such as PET, or polyolefin, such as PP or PE, to the surface.

The excellent isotropic mechanical properties of the sheet steels according to the invention make it possible to produce pull-tab lids for cans (so-called "easy-open ends," EOE) or aerosol cans or components of aerosol cans, such as the bottoms or lids of aerosol cans, e.g., with isotropic properties across the entire surface of the pull-tab lids or the aerosol lids or aerosol cans and the components thereof. The isotropic properties of the sheet steels according to the invention offer advantages especially for circular or oval pull-tab lids and circular bottoms of aerosol cans since the products involved have virtually uniform mechanical properties across their entire circumference. The isotropic mechanical properties of the sheet steels according to the invention also offer advantages for deep drawing applications in which a round sheet metal part (circular blank) is formed, for example, in order to produce a can body for a two-part can since uniform mechanical properties can here again be achieved across the circumference of the formed sheet metal part and since no areas of material thinning with a lower sheet metal thickness are generated during the forming operation.

BRIEF DESCRIPTION OF THE DRAWINGS

These and other properties, features, and advantages of the flat steel product according to the present invention follow from the execution examples described further below with reference to the appended drawings and tables. The drawings show:

FIGS. 7-10 Tables 1-3. Note that in all Drawings and Tables presented herein, the European numerical convention of using a comma as a decimal marker.

DETAILED DESCRIPTION

Figure 1:
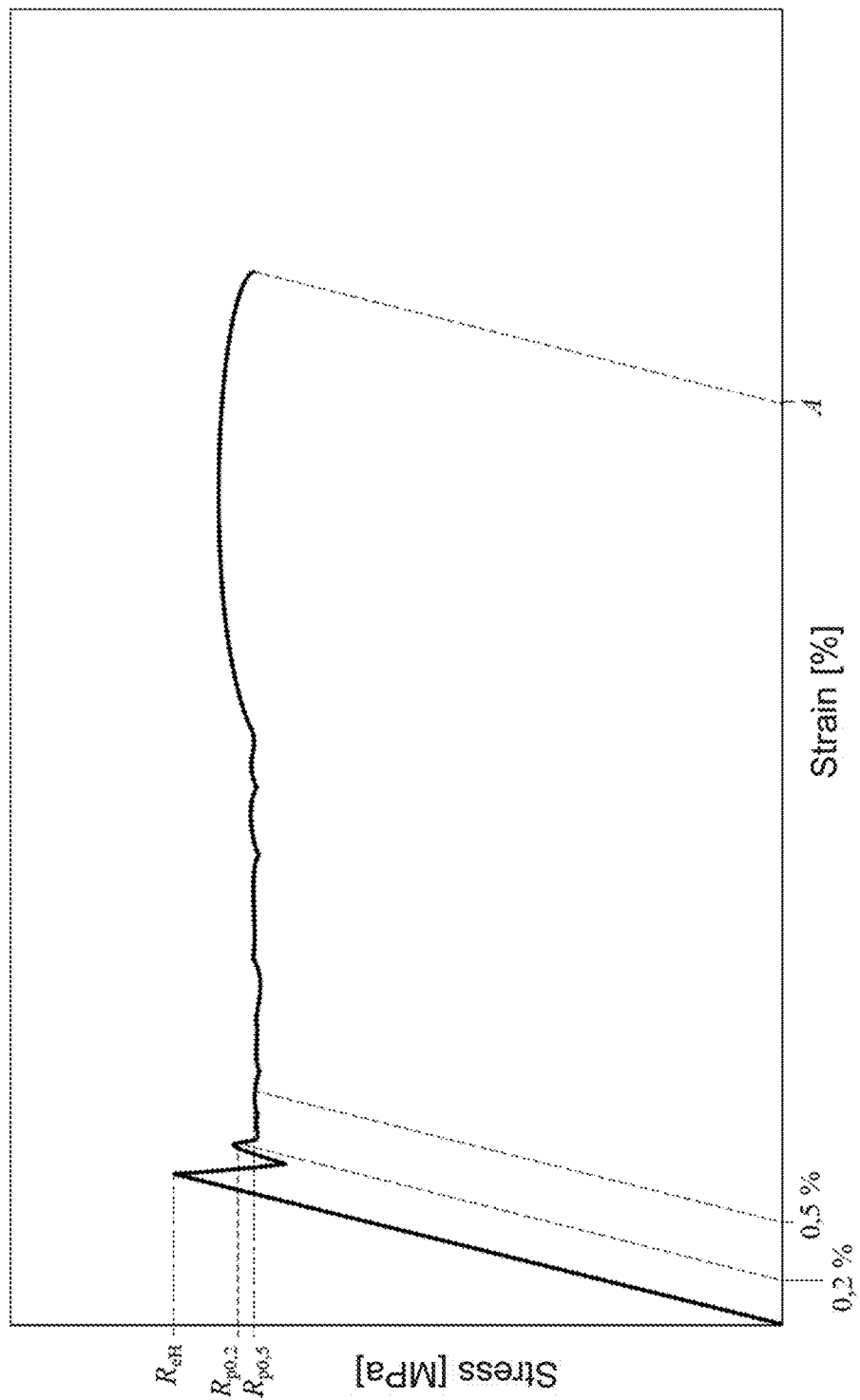
FIG. 1: An example of a schematic stress-strain diagram obtained in a tensile test on a flat steel product according to the invention.

To manufacture flat steel products according to the present invention, a slab is cast from a steel melt and hot-rolled to form a hot-rolled strip. The alloy composition of the steel melt is preferably guided by the threshold limit values specified for packaging steel (e.g., as defined in the Standard ASTM A623-11 "Standard Specification for Tin Mill Products" or in the "European Standard EN 10202"). Below, the components of the steel, from which flat steel products according to the invention can be manufactured, will be explained in detail:

Composition of the Steel:

Carbon, C: a minimum of 0.02% and a maximum of 0.1%, preferably less than 0.085%:

carbon has a hardness- and strength-increasing effect. Therefore, the steel contains a minimum of 0.02 wt % of carbon. To ensure the rollability of the flat steel product in the primary cold rolling procedure and, if appropriate, in a second cold rolling step (temper rolling or dressing) and to not decrease the elongation at break, the carbon content should not be too high. Furthermore, as the carbon content increases, a pronounced anisotropy in the form of banding forms during the manufacture and processing of the flat steel product since carbon, because of its low solubility in the ferrite lattice of the steel is present mainly in the form of cementite. In addition, as the carbon content increases, the surface quality deteriorates and the risk of the formation of cracks in the slab increase as the peritectic point is approached. It is therefore necessary to limit the carbon content to a maximum of 0.1 wt %, since only then will it be possible to effectively prevent the formation of cracks in the slab and the resultant point oxidation (diffusion of oxygen into cracks).

Manganese, Mn: a minimum of 0.17% and a maximum of 0.5%:

Manganese also has a hardness- and strength-increasing effect. In addition, manganese improves the weldability and wear resistance of steel. Further, the addition of manganese reduces the tendency toward red brittleness during hot rolling in that sulfur is bound to less harmful MnS. Furthermore, manganese leads to grain refining, and manganese can increase the solubility of nitrogen in the iron lattice and prevent diffusion of carbon into the surface of the slab. Therefore, a manganese content of a minimum of 0.17 wt % is to be preferred. To achieve high strengths, a manganese content higher than 0.2 wt %, especially 0.30 wt % or higher is to be preferred. However, if the manganese content is too high, the corrosion resistance of the steel suffers, and the food grade quality is no longer ensured. Furthermore, at excessively high manganese contents, the strength of the hot-rolled strip becomes too high, which has the effect that the hot-rolled strip can no longer be cold-rolled. Therefore, the upper threshold limit for the manganese content is 0.5 wt %.

Phosphorus, P: less than 0.03%

Phosphorus is an undesirable residual element in steels. In particular, a high phosphorus content leads to an embrittlement of steel and therefore has a negative effect on the formability of flat steel products, which is the reason that the upper threshold limit for the phosphorus content is 0.03 wt %.

Sulfur, S: more than 0.001% and a maximum of 0.03%

Sulfur is an undesirable residual element which has a negative effect on ductility and corrosion resistance. Therefore, no more than 0.03 wt % sulfur should be present in the steel. On the other hand, however, the measures that have to be taken for desulfurizing steel are technically complex and cost-intensive, which is the reason why a sulfur content lower than 0.001 wt % is no longer justifiable for economic reasons. Therefore, the sulfur content is in a range from 0.001 wt % to 0.03 wt %, most preferably from 0.005 wt % to 0.01 wt %.

Aluminum, Al: more than 0.002% and less than 0.1%

Aluminum is needed in the production of steel as a deoxidizing agent for killing steel. Aluminum also increases the scale resistance and the formability. Therefore, the aluminum content is higher than 0.002 wt %. However, aluminum in combination with nitrogen forms aluminum nitrides which are undesirable in the flat steel products according to the invention since they reduce the free nitrogen content. Furthermore, excessively high aluminum concentrations can lead to surface defects in the form of aluminum clusters. Therefore, aluminum can be used in a concentration of a maximum of 0.1 wt %.

Silicon, Si: less than 0.03%:

Silicon increases the scale resistance in steel and is a precipitation hardening agent. In the production of steel, Si serves as a deoxidizing agent. Another positive influence of Si on steel is that it increases the tensile strength and the yield stress. Therefore, a silicon content of 0.003 wt % or higher is to be preferred. However, if the silicon content is excessively high and, more specifically, exceeds 0.03 wt %, the corrosion resistance of steel can deteriorate, and surface treatments, especially by electrolytical coatings, can be hampered.

Optional nitrogen, No: less than 0.016%, and preferably more than 0.001%

Nitrogen is an optional component in the steel melt, from which the steel for the flat steel product according to the invention is produced. Although nitrogen as a precipitation hardening agent has a hardness- and strength-increasing effect, an excessively high nitrogen content in the steel melt greater than 0.016 wt % has the effect that it is more difficult to cold-roll the hot-rolled strip produced from the steel melt. In addition, a high nitrogen content in the steel melt increases the risk of defects in the hot-rolled strip since the hot formability is reduced at nitrogen concentrations of 0.016 wt % or above. According to the invention, the intention is to increase the nitrogen content of the flat steel product afterwards by nitriding the cold-rolled flat steel product in an annealing furnace. Therefore, introducing nitrogen into the steel melt can be completely omitted. However, to achieve high strength by solution hardening, it is preferable if an initial nitrogen content higher than 0.001 wt %, most preferably of 0.010 wt % or higher is already present in the steel melt.

To incorporate an initial nitrogen content $N_0$ into the flat steel product prior to nitriding in the annealing furnace, nitrogen can be added in the appropriate amount to the steel melt, for example, by blowing in nitrogen gas and/or by adding a solid nitrogen compound such as calcium nitrogen (calcium cyanamide) or manganese nitride.

Optional: nitride-forming elements, especially niobium, titanium, boron, molybdenum, chromium:

In the steel of the flat steel products according to the invention, nitride-forming elements such as aluminum, titanium, niobium, boron, molybdenum, and chromium are undesirable since they reduce the portion of free nitrogen due to nitride formation. Furthermore, these elements are expensive and thus increase production costs. However, on the other hand, the elements niobium, titanium, and boron, for example, as microalloying components increase strength by grain refinement without a reduction in toughness. Therefore, it may be useful to add a certain limited amount of the nitride-forming elements mentioned as alloying components to the steel melt. The steel may therefore (optionally) contain the following nitride-forming alloying components relative to the weight:

Titanium, Ti: preferably more than 0.002%, but for cost reasons, less than 0.01%, Boron, B: preferably more than 0.001%, but for cost reasons, less than 0.005%, and/or Niobium, Nb: preferably more than 0.001%, but for cost reasons, less than 0.01%, and/or Chromium, Cr: preferably more than 0.01% in order to make it possible to use scrap in the production of the steel melt and to hinder the diffusion of carbon on the surface of the slab, but a maximum of 0.08% so as to prevent the formation of carbides and nitrides, and/or Molybdenum, Mo: less than 0.02% in order to prevent an excessively high increase in the recrystallization temperature;

To avoid a reduction of the portion of the free, uncombined nitrogen $N_{free}$ as a result of the formation of nitrides, the total weight content of the nitride-forming elements mentioned in the steel melt is preferably lower than 0.1%.

Other Optional Components:

In addition to the residual iron (Fe) and unavoidable impurities, the steel melt may also contain other optional components, such as, e.g.

optional copper, Cu: more than 0.002 in order to make it possible to use scrap in the production of the steel melt, but less than 0.1% in order to ensure the food grade quality;

optional nickel, Ni: more than 0.01 in order to make it possible to use scrap in the production of the steel melt and to improve the toughness, but less than 0.1% in order to ensure the food grade quality;

optional tin, Sn: preferably lower than 0.03%;

Method of Producing the Flat Steel Product:

With the use of the composition of the steel described, a steel melt is produced, which is first continuously cast and, after cooling, divided into slabs. The slabs are then reheated to preheating temperatures higher than 1100° C., especially 1200° C., and hot-rolled to produce a hot-rolled strip with a thickness ranging from 1 to 4 mm.

The final rolling temperature during hot rolling is preferably higher than the Ar3 temperature in order to maintain the austenitic properties and ranges especially between 800° C. and 900° C.

The hot-rolled strip is wound up to form a coil at a specified and preferably constant winding temperature (reel temperature, HT). The winding temperature is preferably lower than Ar1 in order to remain in the ferritic range, preferably in a range from 500° C. to 7500° C., and most preferably at less than 640° C. in order to prevent the precipitation of AlN. For economic reasons, the winding temperature should be higher than 500° C. A formation of iron nitrides on the surface of the hot-rolled strip can be prevented by cooling the hot-rolled strip at the end of the hot rolling cycle until winding it up at higher cooling rates.

To produce a packaging steel in the form of a thin flat steel product in a thickness range of less than 0.6 mm (blackplate thicknesses) and preferably with a thickness of less than 0.4 mm, the hot-rolled strip is cold-rolled, during the course of which a thickness reduction (degree of reduction or degree of deformation during cold rolling) by a minimum of 80% and preferably ranging from 85% to 98% takes place. To restore the crystal structure of the steel, which was destroyed during cold rolling, the cold-rolled steel strip is subsequently recrystallization-annealed in an annealing furnace. This is accomplished, e.g., by passing the flat steel product in the form of a cold-rolled steel strip through a continuous annealing furnace in which the steel strip is heated to temperatures above the recrystallization temperature of steel. Prior to, or preferably simultaneously with, recrystallization annealing, the cold-rolled flat steel product is nitrided by heating the flat steel product in the annealing furnace in the presence of a nitrogen donor. Nitriding is preferably carried out simultaneously with recrystallization annealing in the annealing furnace by introducing a nitrogen donor, in particular in the form of a nitrogen-containing gas, preferably ammonia ($NH_3$), into the annealing furnace and by heating the flat steel product to an annealing temperature above the recrystallization temperature of steel and maintaining it at the annealing temperature for an annealing time (holding time) of preferably 10 to 150 seconds. The annealing temperature is preferably above 630° C. and especially in a range from 650° C. to 750° C. The nitrogen donor is selected to ensure that at the temperatures in the annealing furnace, the nitrogen donor dissociates to form atomic nitrogen which can diffuse into the flat steel product. Ammonia has proven suitable for this purpose. To prevent an oxidation of the surface of the flat steel product during annealing, a protective gas atmosphere is favorably used in the annealing furnace. The atmosphere in the annealing furnace preferably consists of a mixture of the nitrogen-containing gas, which acts as the nitrogen donor, and a protective gas such as HNx, with the volume content of the protective gas preferably ranging from 90% to 99.5% and the remaining portion of the volume content of the gas atmosphere being formed by the nitrogen-containing gas, especially ammonia gas ($NH_3$ gas).

Execution Examples:

Execution examples of the invention and comparison examples will be described below. Flat steel products (strip steel) were produced from steel melts having the alloy compositions listed in Table 1 (FIG. 7) by hot rolling and subsequent cold rolling.

The cold-rolled flat steel products were subsequently recrystallization-annealed in a continuous annealing furnace by maintaining the flat steel products over an annealing time of 45 seconds at annealing temperatures of 640° C.

The process and material parameters of the thermally treated sheet steel of Table 1 are listed in Table 2 (FIG. 8), where N (after nitriding) is the nitrogen content after nitriding in the annealing furnace, D is the thickness of the sheet steel (in mm), NWG stands for the temper rolling degree during secondary cold rolling (in %), NH3 is the ammonia content in the annealing furnace (in vol %), Rp0.5 is the yield strength at 0.5% offset (in MPa) in the rolling direction, A is the elongation at break (in %) in the rolling direction, and Rm is the tensile strength (in MPa) in the rolling direction.

In the examples according to the invention (Examples 1 to 3, 10 to 12, 15, 16, 18, 19, 21 to 23 and 25 and 26 in Tables 1 and 2), ammonia was introduced into the continuous annealing furnace during the thermal treatment of the flat steel products, so that a gas atmosphere consisting of ammonia and HNx protective gas was present in the continuous annealing furnace.

In Table 2, the volume content of ammonia in the gas atmosphere is given as NH3 (vol %). In the comparison examples (Examples 4 to 9, 13, 14, 17, 20 and 24 in Tables 1 and 2), a 100% HNx protective gas atmosphere was present in the continuous annealing furnace during annealing. In Table 2, the total nitrogen content resulting in the specimens according to the invention by nitriding in the ammonia-containing gas atmosphere of the continuous annealing furnace is given as N (after nitriding) [wt %]. The total nitrogen content N was determined according to DIN standard EN ISO 14284 (particularly subparagraph 4.4.1) after removal of a superficial iron nitride layer which had formed during nitriding on the surface of the specimens.

The total weight content of the nitrogen is composed of an initial nitrogen content in the steel melt (NO, see Table 1) and the nitrogen content ΔN incorporated by nitriding in the continuous annealing furnace, with a considerable portion of the total nitrogen content $N_{free}$ being available in uncombined form and the remainder in combined form as nitride, see Equation (1). Using Equation (1), the weight content of the free nitrogen $N_{free}$ can be estimated based on the weight content of the nitride-forming elements contained in the steel.

After the thermal treatment in the continuous annealing furnace, the cold-rolled and recrystallization-annealed flat steel products were subjected to temper rolling or dressing. The temper rolling degrees (NWG) of the second cold rolling or dressing and the thickness of the temper-rolled flat steel products are listed in Table 2. Finally, the flat steel products were aged by heating the specimen for 20 minutes to 200° C.

Figure 6:
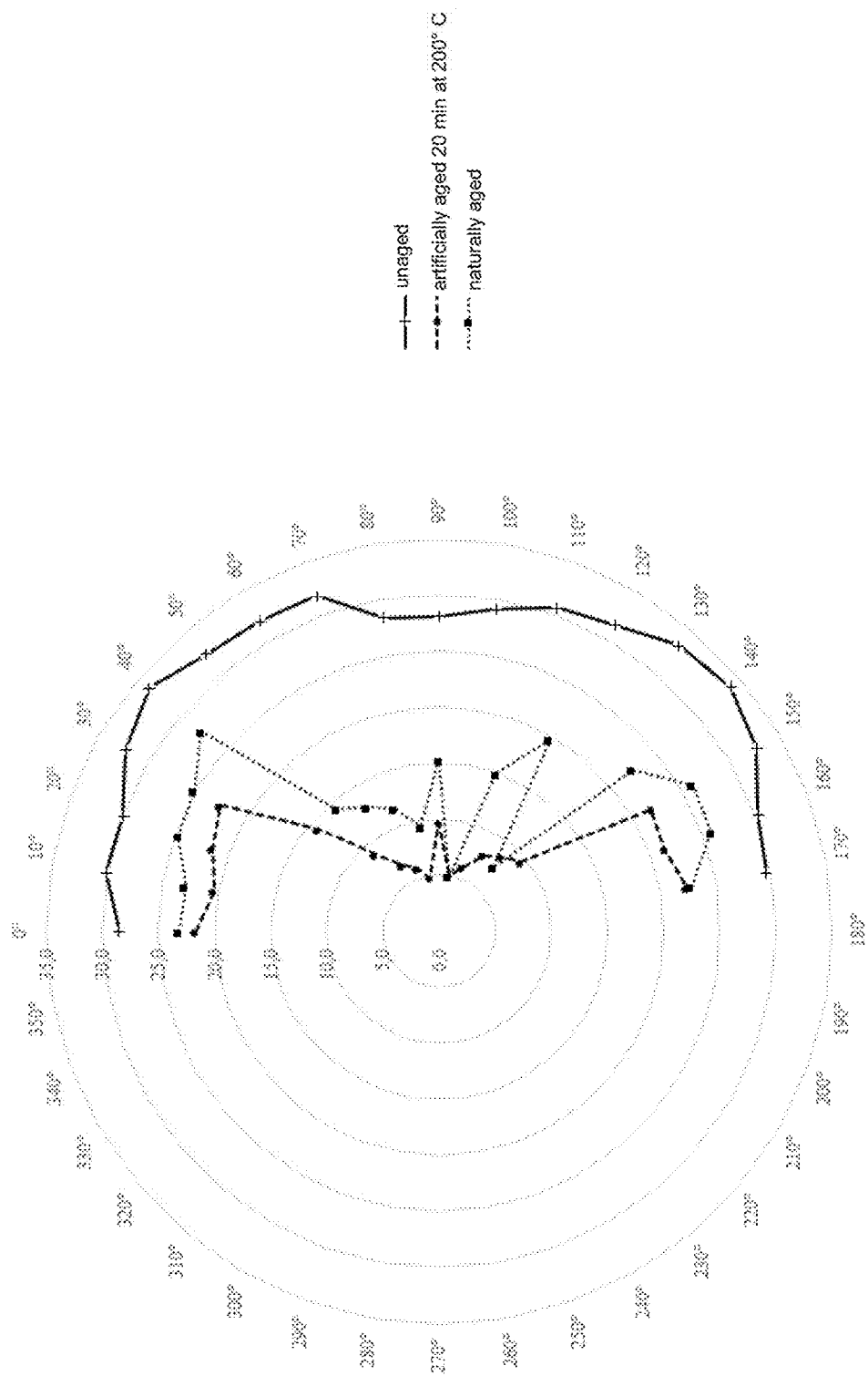
FIG. 6 Illustration of the influence of aging cold-rolled flat steel products on the isotropy with respect to the elongation at break.

FIG. 6 illustrates the effect of aging on the angular dependence of the elongation at break for Comparison Example 5 and compares the unaged condition to the aged condition, with the latter once more differentiating between artificial aging and natural aging. This shows that a significant anisotropy develops only after aging. However, since aging is virtually unavoidable in the practical processing of packaging steel, it is especially important that the isotropy be determined and optimized in the aged condition, which is the object of the present invention.

Tensile tests and examinations of the structure were carried out on the aged specimens of Examples 1 to 26. More specifically, in the tensile tests, the yield strength at 0.5% offset (Rp0.5, measured according to DIN standard EN ISO 6892-1) and the elongation at break (A), and in the examinations of the structure, the mean grain size and the grain elongation, were determined. In FIG. 1, an example of a schematic stress-strain diagram from the tensile tests is shown.

Figure 2A:
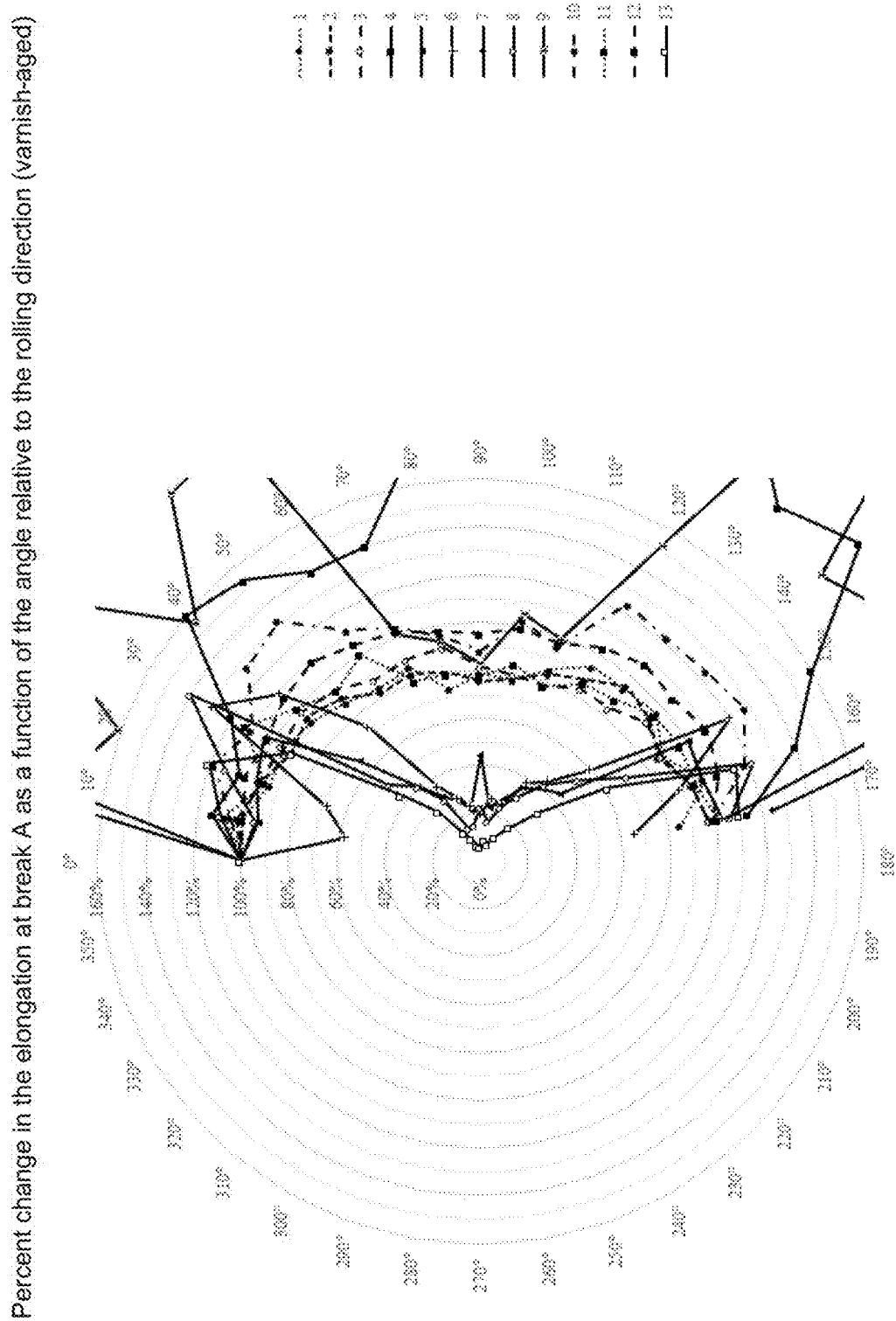
FIGS. 2A&2B Circular graphs of the angular dependence of the elongation at break (A) in the plane of flat steel products tested in tensile tests, with FIG. 2a showing the results of the tested specimens 1 to 13 and FIG. 2b showing the results of the tested specimens 14 to 26.
Figure 2B:
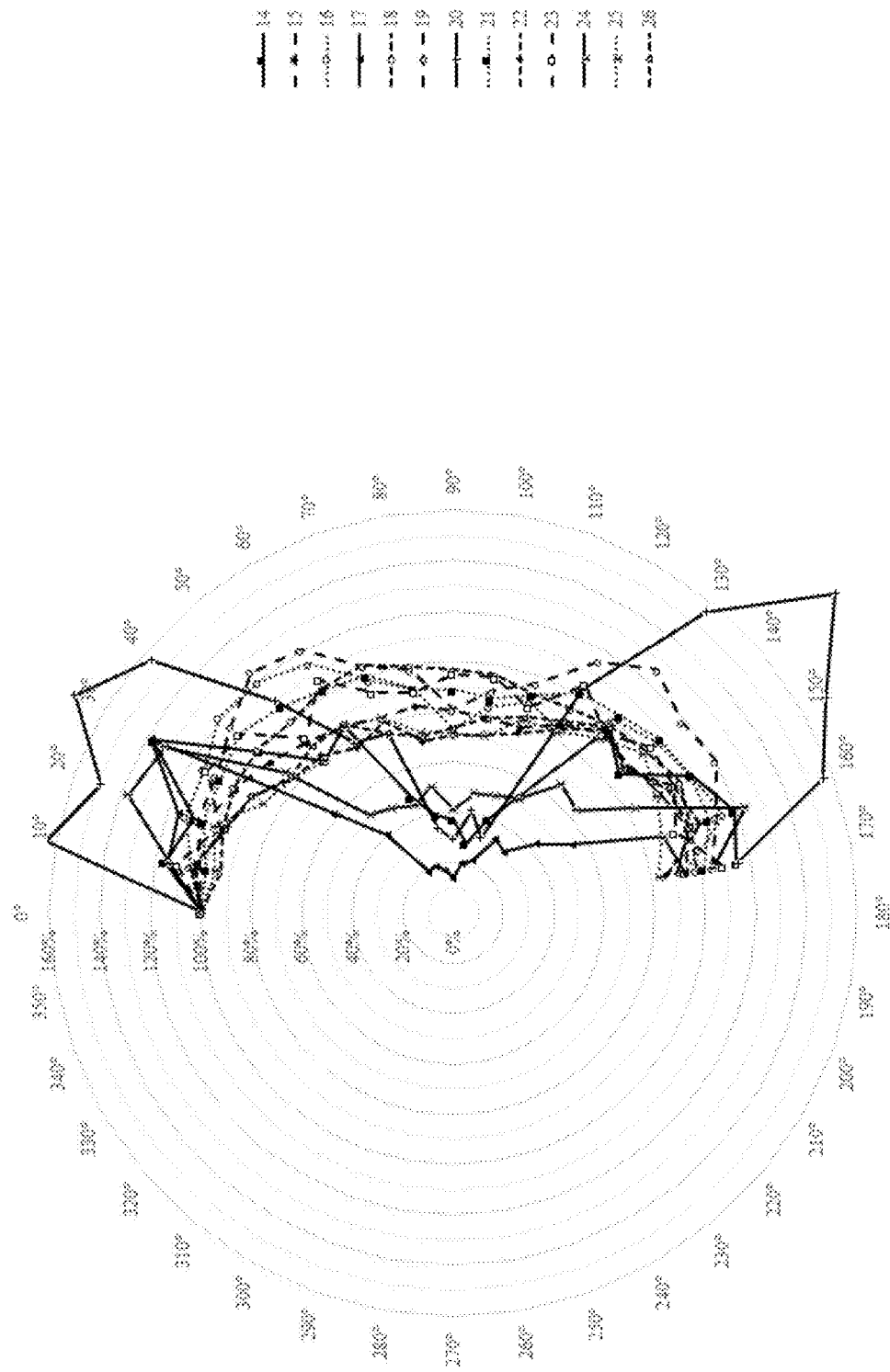
Figure 3A:
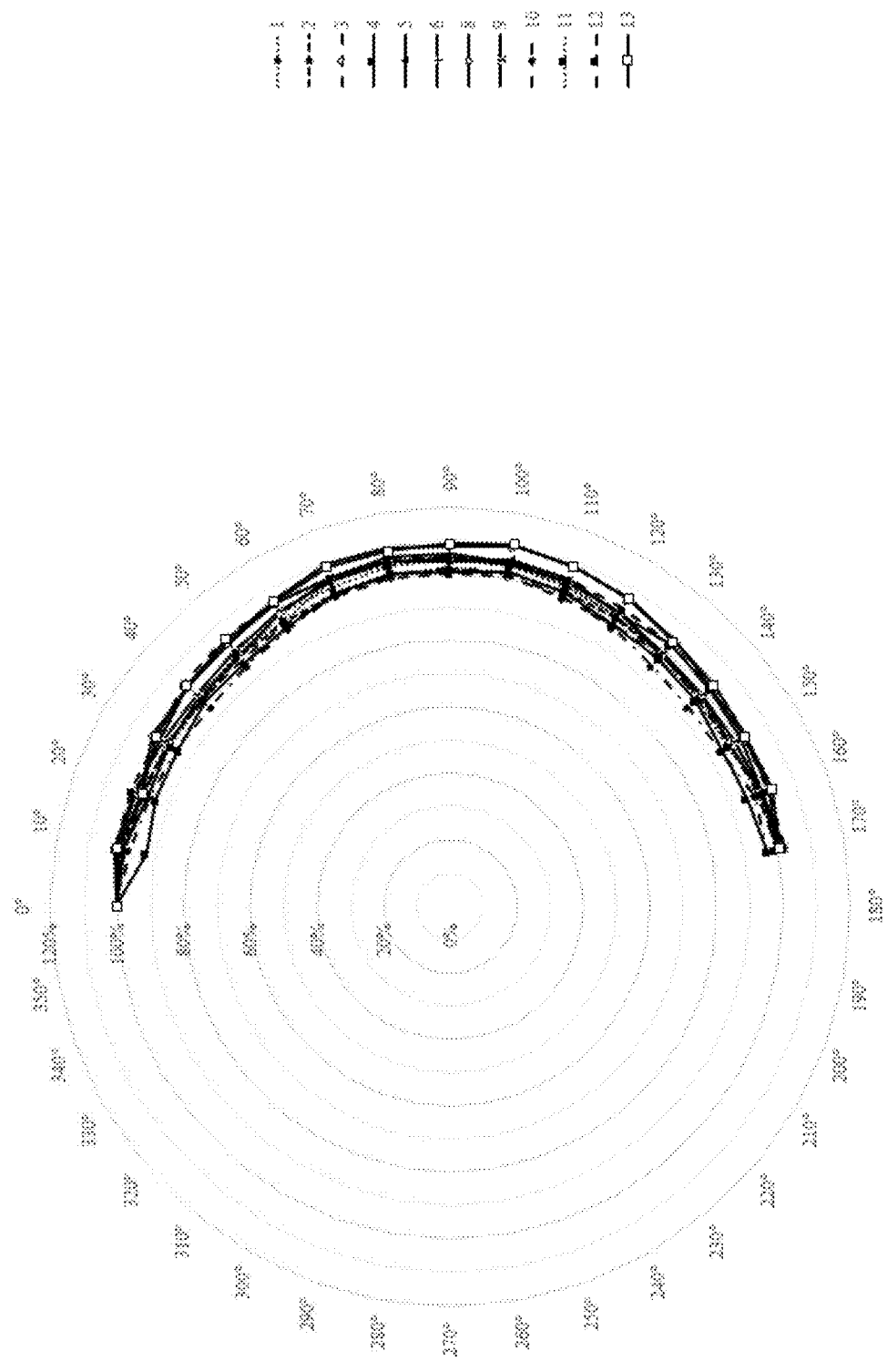
FIGS. 3A&3B Circular graphs of the angular dependence of the yield strength at 0.5% offset (Rp0.5) in the plane of flat steel products tested in tensile tests, with FIG. 3a showing the results of the tested specimens 1 to 13 and FIG. 3b showing the results of the tested specimens 14 to 26.
Figure 3B:
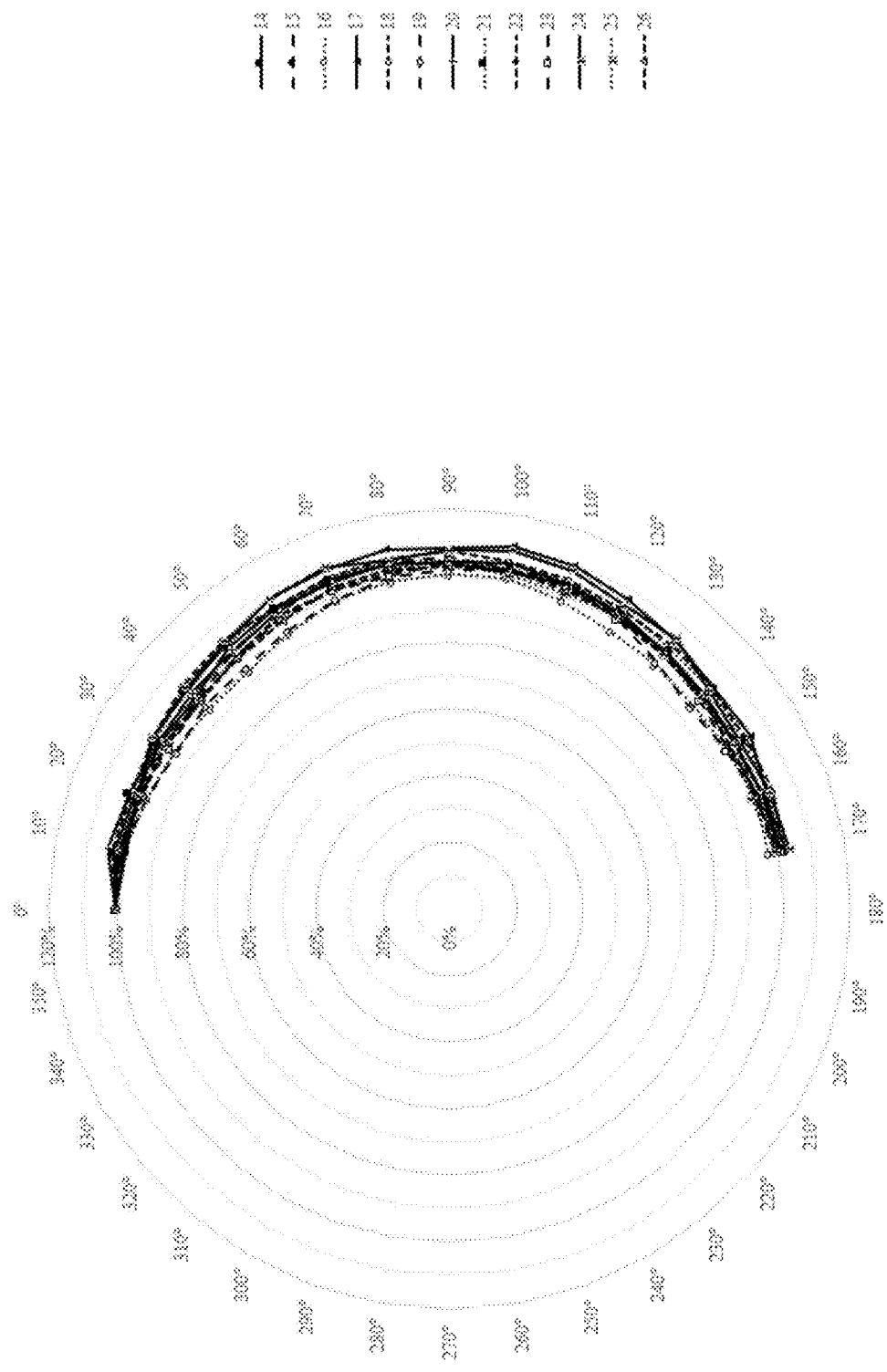

The stress-strain diagram of aged flat steel products has a discontinuous pattern. As a rule, the upper or lower yield strength is used as a reference value for characterizing the strength, sometimes also the tensile strength. The upper yield strength measured in the tensile test is highly dependent on the measuring conditions, the testing machine used, and the orientation thereof. In addition, for a specific testing machine, the spread of the value is especially high. For cold working processes, the lower yield strength is a relevant parameter for determining the formability of a flat steel product. However, it is difficult or impossible to determine the lower yield strength if, following the Luders region, the material does not strain-harden. Furthermore, in this case, the tensile strength is not defined. Therefore, instead of the lower yield strength, the plateau height, which is used as a measure of the yield strength at 0.5% offset (Rp0.5), is calculated since this value can be conclusively determined (FIG. 1). The parameter yield strength at 0.2% offset (Rp0.2), which is frequently determined to characterize unaged flat steel products, is unreliable for aged specimens because it is located too close to the upper yield strength and in a region in which the strain has not yet stabilized. For these reasons, the yield strength at 0.5% offset (Rp0.5) is here determined as a relevant measure of the strength of the samples. In addition, in the tensile tests, the elongation at break (A) of the specimens was determined. To determine the anisotropy/isotropy with respect to the yield strength (Rp0.5) and of the elongation at break (A) in the plane of the sheet metal, all measurements of the yield strength at 0.5% offset (Rp0.5) and of the elongation at break (A) were carried out along the rolling direction (0°) and in the plane of the flat steel product in increments of 100 in an angular range of 10° to 170° relative to the rolling direction. The determined dependence of the elongation at break A(α) on the angle α relative to the rolling direction (0°) is illustrated in a circular graph in FIG. 2, with FIG. 2a showing the results of the tested specimens 1 to 13, and FIG. 2b showing the results of the tested specimens 14 to 26. The determined dependence of the yield strength at 0.5% offset Rp0.5(α) on the angle α relative to the rolling direction (0°) is shown in the circular graph of FIG. 3, with FIG. 3a showing the results of the tested specimens 1 to 13, and FIG. 3b showing the results of the tested specimens 14 to 26.

Figure 4A:
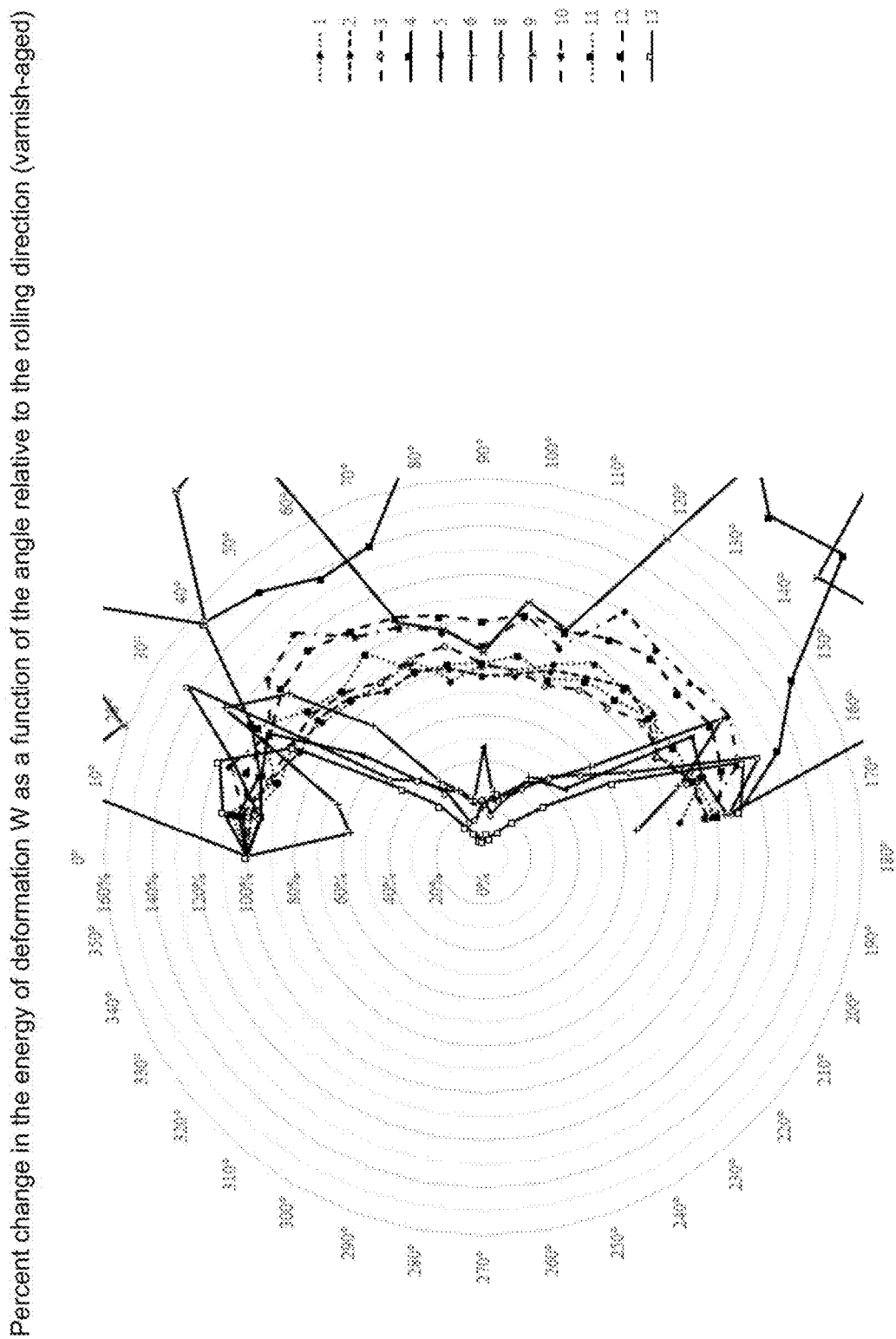
FIGS. 4A&4B Circular graphs of the angular dependence of the energy of deformation W=A-Rp0.5 in the plane of flat steel products tested in tensile tests, with FIG. 4a showing the results of the tested specimens 1 to 13 and FIG. 4b showing the results of the tested specimens 14 to 26.
Figure 4B:
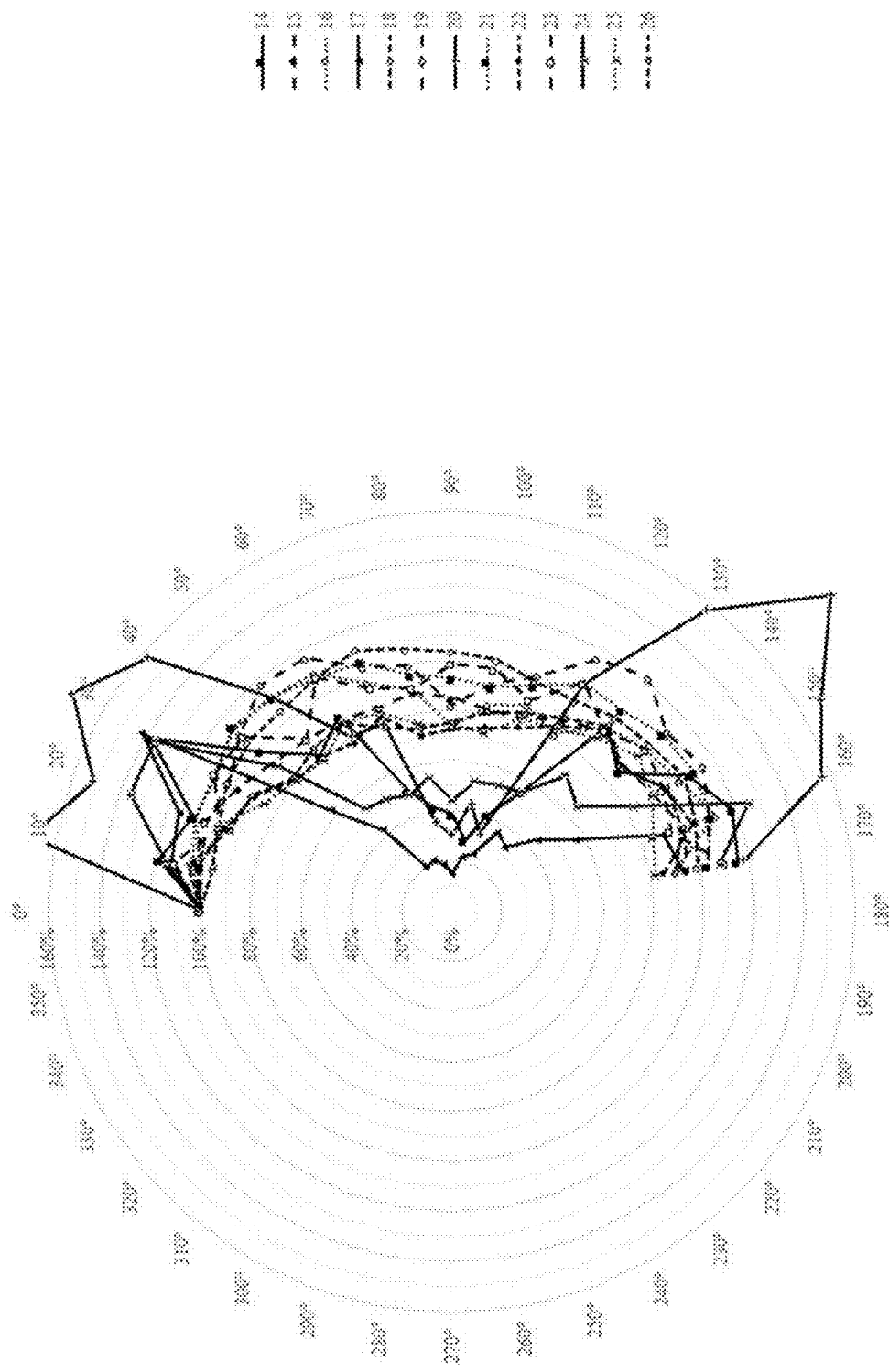

From the measured values determined for the dependence of the yield strength at 0.5% offset (Rp0.5) and the elongation at break (A) on the angle α relative to the rolling direction, the parameter energy of deformation W(α), defined as the product of elongation at break A(α) and yield strength at 0.5% offset Rp0.5(α), was computed. The result of the energy of deformation W(α) thereby determined as a function of the angle α relative to the rolling direction (0°) is shown in the circular graphs of FIG. 4, with FIG. 4a showing the results for the specimens of Examples 1 to 13, and FIG. 4b showing the results for the specimens of Examples 14 to 26.

As FIGS. 2 to 4 indicate, compared to the comparison examples (Examples 4 to 9, 13, 14, 17, 20 and 24) (which were not nitrided in the continuous annealing furnace), the specimens according to the invention have an improved isotropy with respect to the yield strength at 0.5% offset (Rp0.5), the elongation at break (A) and the energy of deformation W(α) resulting as a product thereof. As FIG. 2 indicates, the specimens according to the invention have an elongation at break A(α), which in the plane of the sheet metal is within a range of 60% to 140% of the elongation at break in the rolling direction A(0°). FIG. 3 shows that the specimens according to the invention have a yield strength at 0.5% offset (Rp0.5) which is dependent on the angle α relative to the rolling direction (0°), and which in the plane of the sheet metal is within a range of 90% to 110% of the yield strength in the rolling direction Rp0.5(0°). As FIG. 4 shows, the specimens according to the invention have an energy of deformation W(α), which in the plane of the sheet metal is dependent on the angle α relative to the rolling direction (0°) and which is within a range of 60% to 140% of the energy of deformation in the rolling direction W(0°). In contrast, as FIGS. 2 to 4 indicate, the comparison examples have a considerably anisotropy with respect to the elongation at break (A), the yield strength at 0.5% offset (Rp0.5), and the energy of deformation.

Figure 5:
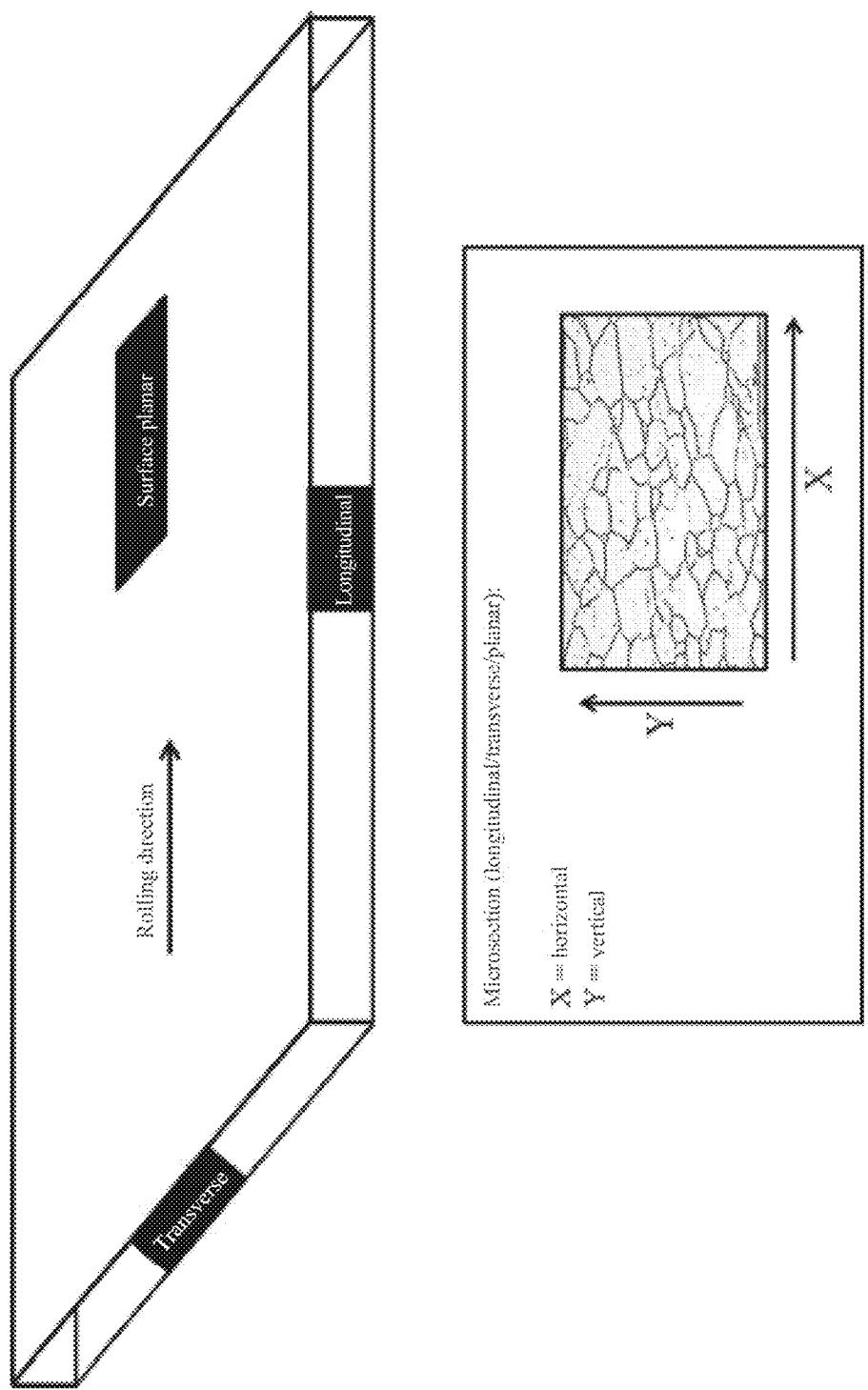
FIG. 5 A schematic representation of the tests to identify the grain structure of the tested flat steel products.

To determine the grain structure of the flat steel products, microsections of the specimens were prepared in planes along and transverse to the rolling direction as well as in flat planes of the metal sheets. The sectional planes are illustrated in FIG. 5. Using the microsections, the grain size and the grain elongation were determined by means photomicrographic examination of the sectional planes of the specimen. On these microstructure photographs, the number of intersections occurring between the grid lines and the grain boundaries are counted. The mean grain size is obtained from the mean value of the linear intercept segment (mean fiber length). In FIG. 5, the grain elongation or the elongation of the fiber length of the grains of the steel structure is explained, using the directions x (horizontal, along the rolling direction) and y (vertical, in the direction of the thickness of the flat steel product). In the x-direction of the grain, the horizontal fiber length S_H is determined. Perpendicular thereto in the y-direction, the vertical fiber length S_V is determined. This is done in microsections which were acquired both along and transverse to the rolling direction. When determining the fiber lengths, not every grain is individually measured, but instead a uniform grid pattern is placed on the photomicrograph of the structure, and by means of the grid length and the number of the intersections, a fiber length is determined, which can be used as a substitute for the grain size. The mean horizontal and vertical fiber length corresponds to the mean value of the analysis of all acquired areas of the microstructure. The grain elongation S is defined as: S=S_H/S_V or S=x/y.

Figure 10:
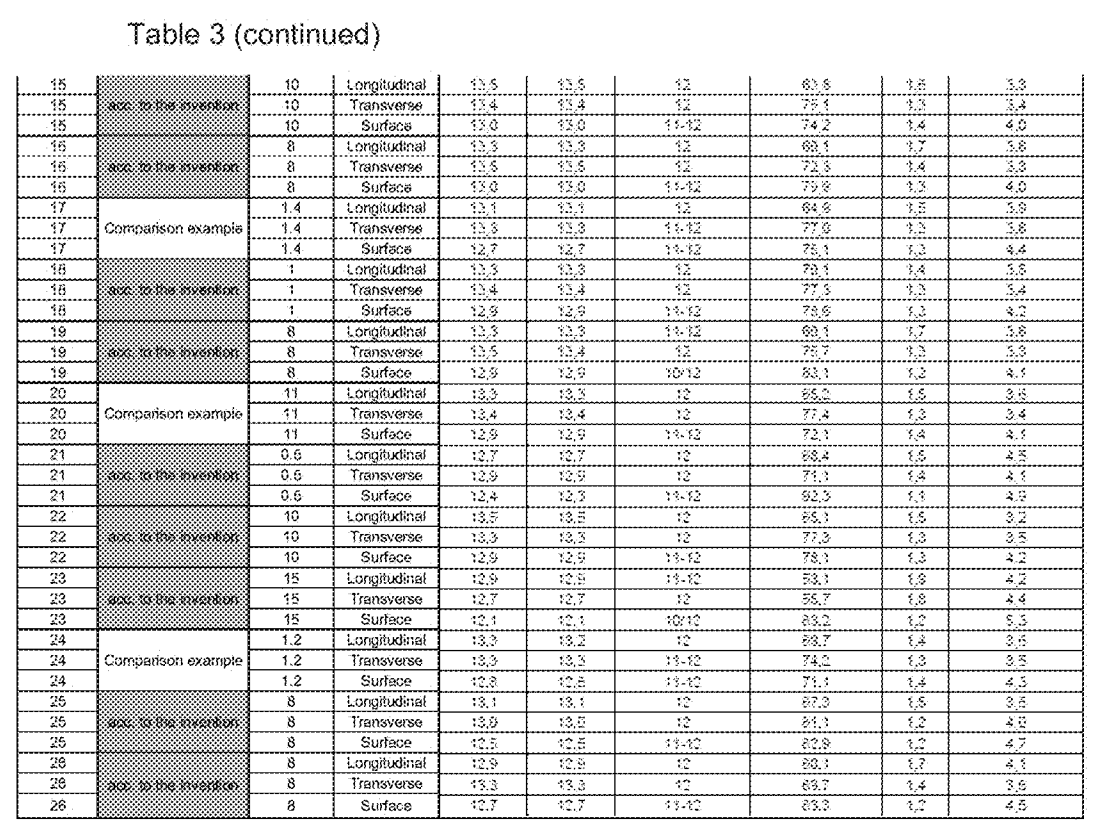

The grain size ( ) (determined according to ASTM E 112 and DIN standard EN ISO 643 and using comparison photos) and the grain elongation S (determined by means of the linear intercept method) as well as the mean fiber length of the specimens are listed in Table 3 (FIGS. 9 and 10). All specimens have a mean fiber length in the range from 3.3 to 5.4 μm. In the longitudinal sections of the flat steel product, the direction-dependent grain elongation (S) in the rolling direction (0°) is a minimum of 1.4, in the planar sections of the flat steel product, it is a minimum of 1.1. The grain elongation (S) transverse to the rolling direction (90°) has a value of a minimum of 1.2. In this respect, no significant difference between the specimens according to the invention and the comparison specimens was determined.

This leads to the conclusion that the higher strength of the specimens according to the present invention is not realized by means of grain refinement but is decisively achieved by means of solution hardening generated by nitriding in the continuous annealing furnace. Furthermore, it shows that the improved isotropy with respect to the mechanical properties of the specimens according to the present invention can be achieved in spite of an anisotropy (caused by cold rolling) in the structure. The anisotropy of the structure, which is also present in the specimens according to the invention, results from the grain elongation S, which in the specimens according to the invention is comparable to the grain elongation of the comparison samples. The solution hardening, which was generated by nitriding in the continuous annealing furnace, therefore not only led to an increase in the strength (tensile strength Rm), but also to an improvement of the homogeneity of the mechanical parameters such as elongation at break A and yield strength at 0.5% offset Rp0.5, as well as the energy of deformation W=A·Rp0.5 resulting therefrom.

What is claimed is:

1. A cold-rolled flat steel product for packaging materials, the cold-rolled flat steel product being cold-rolled from steel along a rolling direction (0°) and having a thickness of less than 0.6 mm and comprising the following components in percent by weight:
   C: 0.02-0.1%,
   Si: <0.03%,
   Mn: 0.17-0.5%,
   P: <0.03%,
   S: 0.001-0.03%,
   Al: 0.002-0.1%,
   N: 0.014-0.12%,
   wherein the flat steel product in an aged condition has a 0.5% yield strength (Rp0.5) of at least 450 MPa and an elongation at break (A) of at least 5% and a working capacity W(α) that is defined as the product of the elongation at break (A) and the 0.5% yield strength (Rp0.5), the working capacity being direction dependent and, as a function of the angle (α) relative to the rolling direction (0°), having no less than 60% and no more than 140% of the working capacity in the rolling direction W(0°), and
   a total weight content of free nitrogen in the flat steel product is at least 0.01% by weight, the free nitrogen being nitrogen that is interstitially incorporated in uncombined form in the flat steel product.

2. The flat steel product as in claim 1, wherein the 0.5% yield strength Rp0.5(α) is direction dependent and, as a function of the angle (α) relative to the rolling direction (0°), is no less than 90% and no more than 110% of the 0.5% yield strength in the rolling direction Rp0.5(0°).

3. The flat steel product as in claim 1, wherein the elongation at break A(α) is direction dependent and, as a function of the angle (α) relative to the rolling direction (0°), is no less than 60% and no more than 140% of the elongation at break in the rolling direction A(0°).

4. The flat steel product as in claim 1, wherein the working capacity W(α) is direction dependent and, as a function of the angle (α) relative to the rolling direction (0°), has is a minimum of 70% and a maximum of 130% of the working capacity in the rolling direction W(0°).

5. The flat steel product as in claim 1, wherein the flat steel product has a steel structure comprising grains with a mean fiber length of 3.0 to 6.0 μm.

6. The flat steel product as in claim 1, wherein the flat steel product has a steel structure comprising grains with a mean horizontal fiber length (S_H) and a mean vertical fiber length (S_V) and a grain elongation (S), which is defined as the ratio of the mean horizontal fiber length (S_H) to the mean vertical fiber length (S_V), the grain elongation (S) in the rolling direction (0°) having a value of at least 1.4 in longitudinal sections of the flat steel product and a value of at least 1.1 in planar sections of the flat steel product.

7. The flat steel product as in claim 6, wherein the grain elongation (S) transverse to the rolling direction (90°) has a value of at least 1.2.

8. The flat steel product as in claim 1, wherein the flat steel product further comprises one or a plurality of the following components in percent by weight:
   Cr: <0.1%,
   Ni: <0.1%, Cu: <0.1%,
Ti: <0.01%,
B: <0.005%,
Nb: <0.01%,
Mo: <0.02%,
Sn: <0.03%.

9. The flat steel product as in claim 1, wherein the flat steel product bring is produced by:
  hot rolling a slab of steel to form a hot-rolled steel strip;
  winding the hot-rolled steel strip at a winding temperature of 500° C. to 750° C.,
  cold rolling the hot-rolled steel strip at a reduction ratio of at least 80% to form a cold-rolled steel strip,
  nitriding the cold-rolled steel strip in an annealing furnace in the presence of a nitrogen donor comprising ammonia gas in a volume concentration of between 0.04% and 0.4% of a gas atmosphere in the annealing furnace and at a temperature of at least 550° C.,
  after nitriding the cold-rolled steel strip in the annealing furnace, recrystallization annealing the cold-rolled steel strip in the annealing furnace at an annealing temperature of of at least 630° C.;
  cooling the recrystallization-annealed steel strip to room temperature, and
  temper rolling the recrystallization-annealed steel strip at a temper rolling degree of 0.2% to 45%,
  wherein the properties of the 0.5% yield strength (Rp0.5) being at least 450 MPa, the elongation at break (A) being at least 5%, and the working capacity W($\alpha$), as a function of the angle ($\alpha$) relative to the rolling direction (0°), being no less than 60% and no more than 140% of the working capacity in the rolling direction W(0°) of the flat steel product are obtained after aging the temper-rolled steel strip.

10. The flat steel product as in claim 9, wherein a final rolling temperature during the hot rolling of the slab is higher than the Ar3 temperature.

11. The flat steel product as in claim 9, wherein a dwell time of the flat steel product in the annealing furnace during the nitriding and the recrystallization annealing is in a range of 10 seconds to 400 seconds.

12. The flat steel product as in claim 9, wherein the temper rolling degree is 18% or lower.

13. The flat steel product as in claim 9, wherein the nitrogen donor at the temperatures in the annealing furnace during the nitriding is at least partially dissociated to atomic nitrogen.

14. The flat steel product as in claim 9, wherein the hot-rolled steel strip has an initial nitrogen content $N_0$ in a range of 0.001% by weight to 0.016% by weight, and the nitrogen content in the steel strip is increased by $\Delta N \geq 0.002\%$ by weight during recrystallization annealing due to the presence of the nitrogen donor.

15. The flat steel product as in claim 1, wherein the flat steel product has further comprises a surface coating.

16. The flat steel product as in claim 15, wherein the surface coating comprises at least one of the following coatings: an electrolytically applied tin coating, a chromium/chromium oxide coating, an organic coating, an organic paint, or a polymer sheet.

17. The flat steel product as in claim 1, wherein the aged condition of the flat steel product is achieved naturally by prolonged storage and/or by paint aging performed by application of a paint and subsequent drying, or artificially by heating the flat steel product for 20 minutes to temperatures in a range of 200° C. to 210° C.

18. A method for producing a flat steel product having a thickness of less than 0.6 mm, said method comprising:
  hot rolling a slab of steel to form a hot-rolled steel strip;
  winding the hot-rolled steel strip at a winding temperature of 500° C. to 750° C.;
  cold rolling the hot-rolled steel strip along a rolling direction (0°) at a reduction ratio of at least 80% to form a cold-rolled steel strip;
  nitriding the cold-rolled steel strip in an annealing furnace in the presence of a nitrogen donor comprising ammonia gas in a volume concentration of between 0.04% and 0.4% of a gas atmosphere in the annealing furnace and at a temperature of at least 550° C.;
  after nitriding the cold-rolled steel strip in the annealing furnace, recrystallization annealing the cold-rolled steel strip in the annealing furnace at an annealing temperature of at least 630° C.;
  cooling the recrystallization-annealed steel strip to room temperature; and
  temper rolling the recrystallization-annealed steel strip at a temper rolling degree of 0.2% to 45%,
  wherein properties of the flat steel product evolve after the temper-rolled steel strip has been aged.

19. The method as in claim 18, further comprising:
  after temper rolling the recrystallization-annealed steel strip, aging the temper-rolled steel strip, the aged steel strip having a 0.5% yield strength (Rp0.5) of at least 450 MPa and an elongation at break (A) of at least 5% and a working capacity W($\alpha$) that is defined as the product of the elongation at break (A) and the 0.5% yield strength (Rp0.5), the working capacity being direction dependent and, as a function of the angle ($\alpha$) relative to the rolling direction (0°), having no less than 60% and no more than 140% of the working capacity in the rolling direction W(0°).

20. The method as in claim 18, wherein the properties of the flat steel product after the temper-rolled steel strip has been aged are a 0.5% yield strength (Rp0.5) of at least 450 MPa and an elongation at break (A) of at least 5% and a working capacity W($\alpha$) that is defined as the product of the elongation at break (A) and the 0.5% yield strength (Rp0.5), the working capacity being direction dependent, and as a function of the angle ($\alpha$) relative to the rolling direction (0°), having no less than 60% and no more than 140% of the working capacity in the rolling direction W(0°).

* * * * *